(12) United States Patent
Oduwaiye et al.

(10) Patent No.: US 11,252,689 B2
(45) Date of Patent: Feb. 15, 2022

(54) WI-FI ACCESS POINT COORDINATED TRANSMISSION OF DATA

(71) Applicant: CHARTER COMMUNICATIONS OPERATING, LLC, St. Louis, MO (US)

(72) Inventors: Muhib Oduwaiye, Aurora, CO (US); Volkan Sevindik, Reston, VA (US); Vijay Kumar Mechineni, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 51 days.

(21) Appl. No.: 16/510,596

(22) Filed: Jul. 12, 2019

(65) Prior Publication Data

US 2021/0014819 A1  Jan. 14, 2021

(51) Int. Cl.
*H04W 60/00* (2009.01)
*H04W 72/04* (2009.01)
*H04W 88/08* (2009.01)
*H04W 84/12* (2009.01)

(52) U.S. Cl.
CPC ............ *H04W 60/00* (2013.01); *H04W 72/04* (2013.01); *H04W 84/12* (2013.01); *H04W 88/08* (2013.01)

(58) Field of Classification Search
CPC ..... H04W 60/00; H04W 72/04; H04W 84/12; H04W 88/08; H04W 28/16
See application file for complete search history.

(56) References Cited

U.S. PATENT DOCUMENTS

| | | | |
|---|---|---|---|
| 8,997,136 B2 | 3/2015 | Brooks | |
| 10,341,908 B1* | 7/2019 | Bhartia | H04L 63/061 |
| 10,405,366 B1* | 9/2019 | Liu | H04W 24/02 |
| 2008/0304456 A1* | 12/2008 | Iino | H04W 12/02 |
| | | | 370/338 |
| 2013/0301607 A1 | 11/2013 | McCann et al. | |
| 2014/0056278 A1* | 2/2014 | Marinier | H04W 52/367 |
| | | | 370/330 |
| 2014/0112301 A1* | 4/2014 | Shu | H04W 76/10 |
| | | | 370/329 |
| 2014/0128092 A1* | 5/2014 | Xiong | H04W 88/06 |
| | | | 455/454 |
| 2015/0110087 A1 | 4/2015 | Salkintzis et al. | |
| 2015/0131438 A1 | 5/2015 | Nirantar et al. | |
| 2015/0281934 A1* | 10/2015 | Kawaguchi | H04W 76/50 |
| | | | 370/259 |
| 2015/0288427 A1* | 10/2015 | Wang | H04W 72/1284 |
| | | | 370/329 |

(Continued)

FOREIGN PATENT DOCUMENTS

WO    WO-2014060777 A2    4/2014

*Primary Examiner* — Shah M Rahman
(74) *Attorney, Agent, or Firm* — Gazdzinski & Associates, PC

(57) ABSTRACT

Apparatus and methods for access point coordination of data transmissions within a wireless local area network (WLAN). In one embodiment, a method of managing a WLAN using an access point (AP) coordination system. The AP coordination system accepts client device requests through their associated APs and coordinates one or more APs within the WLAN to fulfill the client requests, without forcing the client devices to associate with different APs. The APs fulfilling a client device request are masked under the BSSID of the client-associated AP.

21 Claims, 22 Drawing Sheets

(56) References Cited

U.S. PATENT DOCUMENTS

| | | | | |
|---|---|---|---|---|
| 2015/0289270 A1* | 10/2015 | Knapp | ............... | H04W 88/10 |
| | | | | 455/452.1 |
| 2016/0081124 A1* | 3/2016 | Yang | ............... | H04W 72/1205 |
| | | | | 370/329 |
| 2016/0112921 A1* | 4/2016 | Nagasaka | ............... | H04W 36/02 |
| | | | | 370/331 |
| 2016/0198402 A1* | 7/2016 | Ko | ............... | H04W 12/08 |
| | | | | 370/329 |
| 2017/0318458 A1* | 11/2017 | Laselva | ............... | H04L 9/14 |
| 2018/0035462 A1* | 2/2018 | Mallik | ............... | H04W 48/16 |
| 2018/0248663 A1* | 8/2018 | Mueller | ............... | H04B 7/0452 |
| 2020/0084712 A1* | 3/2020 | Wu | ............... | H04B 7/0608 |

* cited by examiner

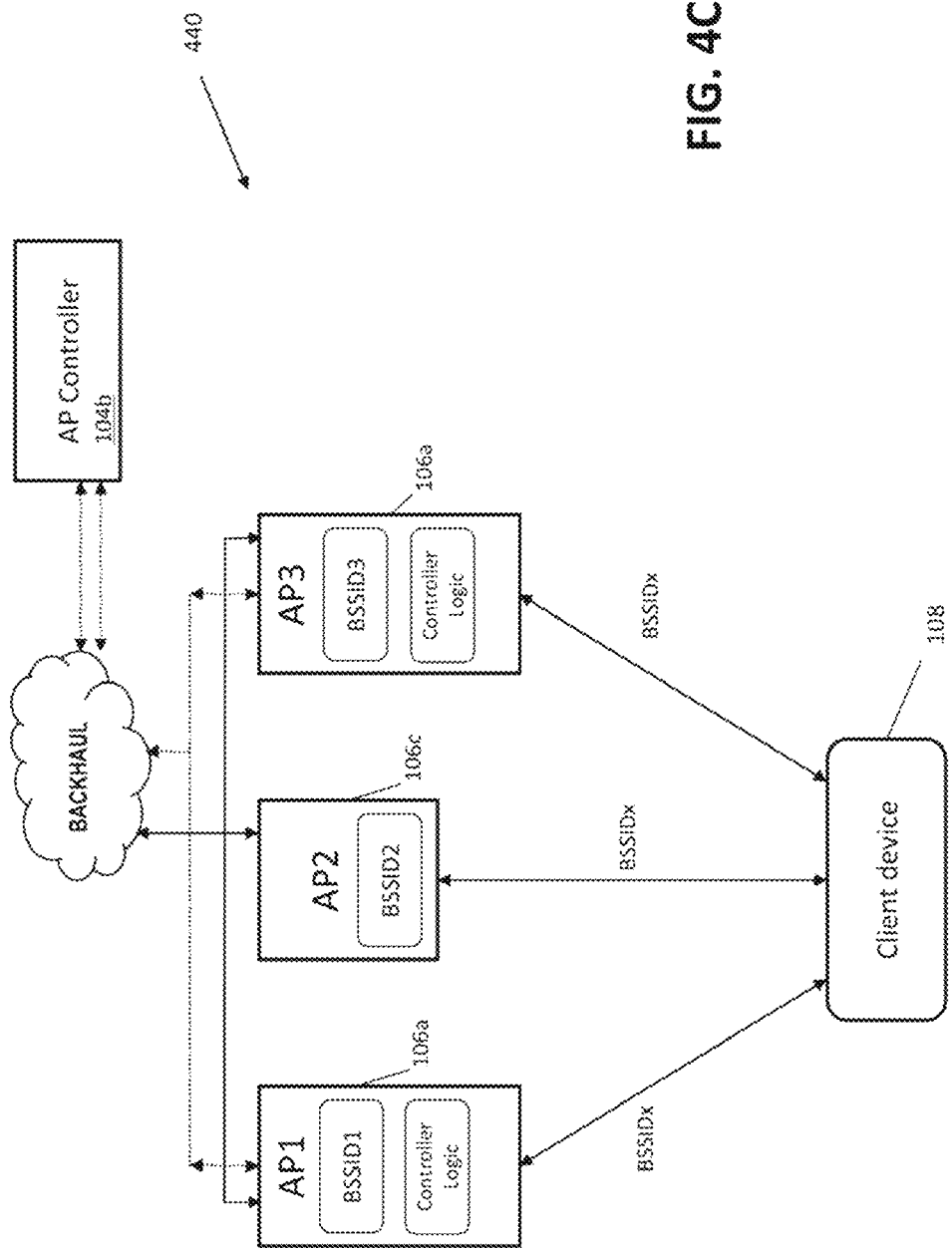

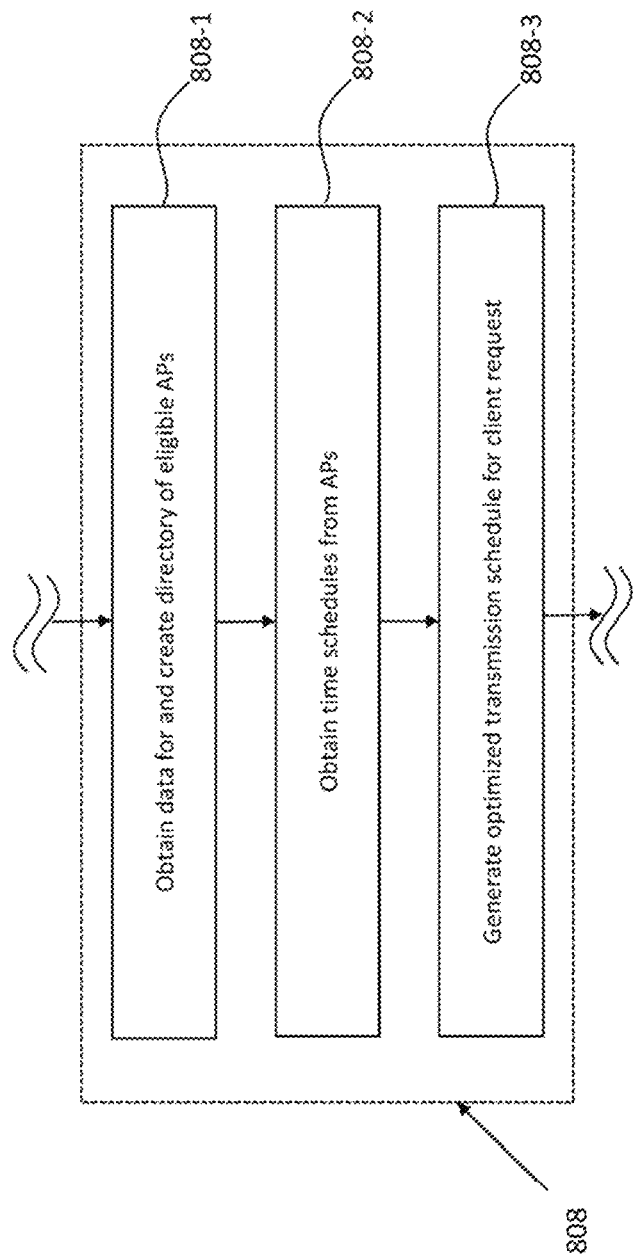

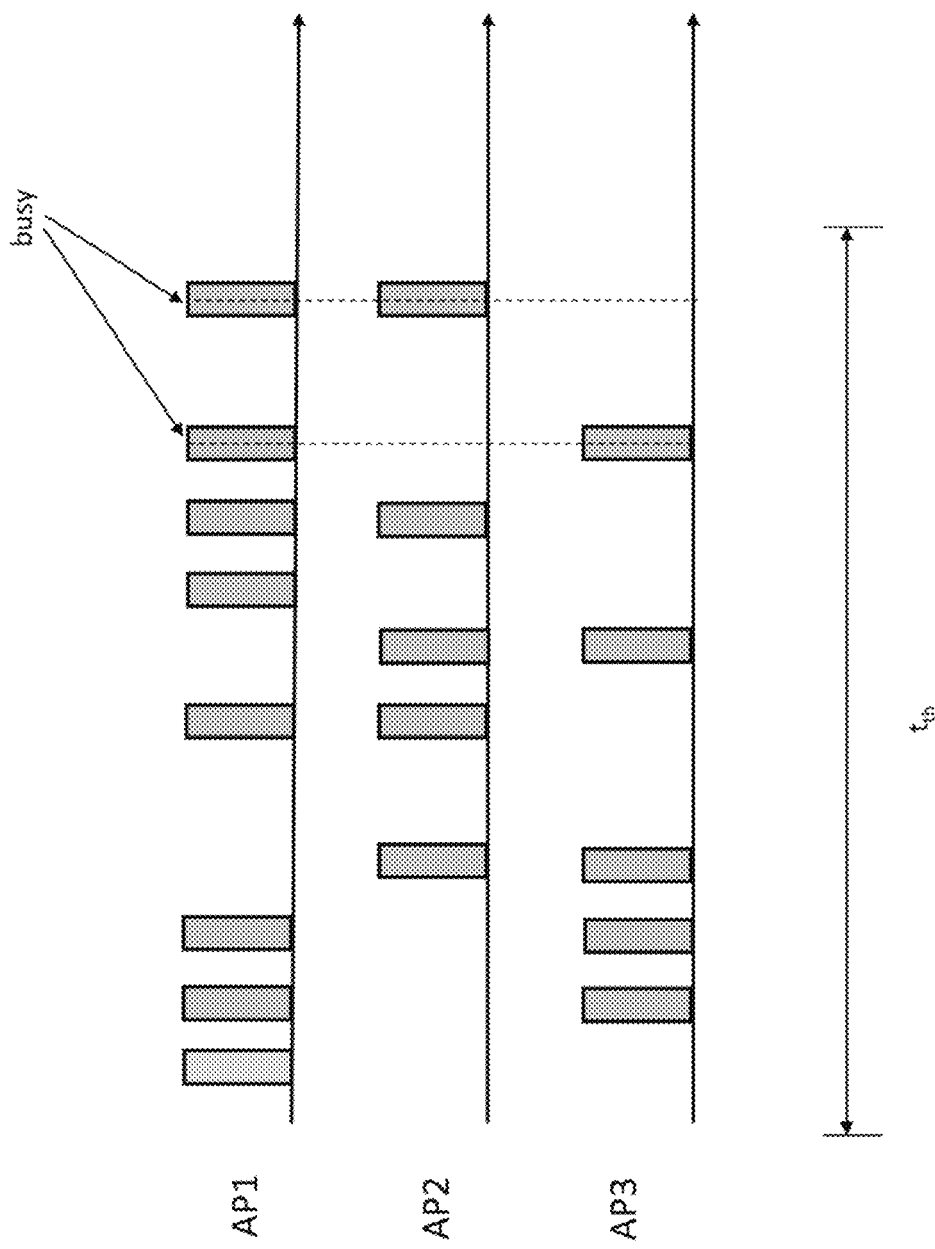

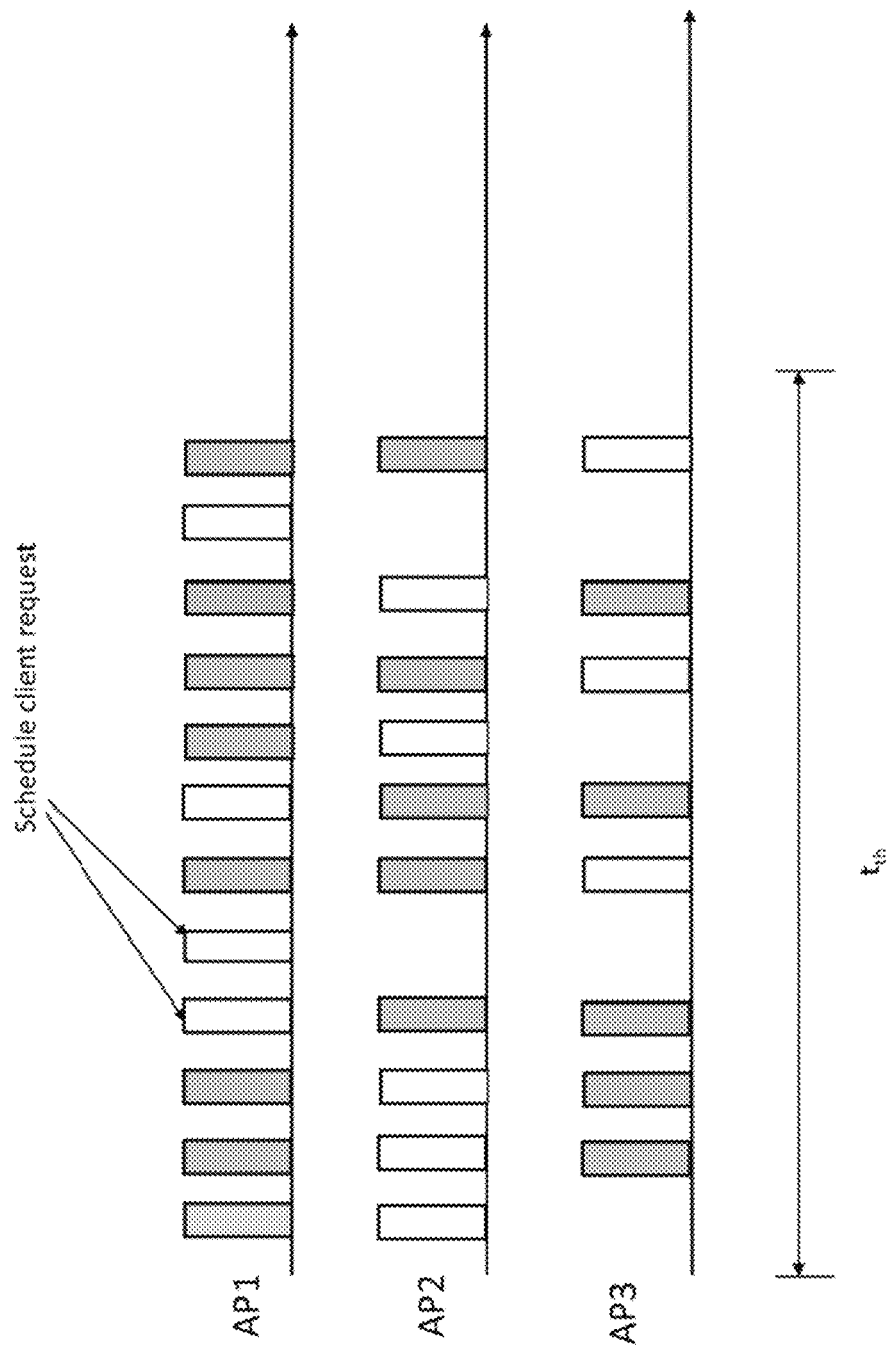

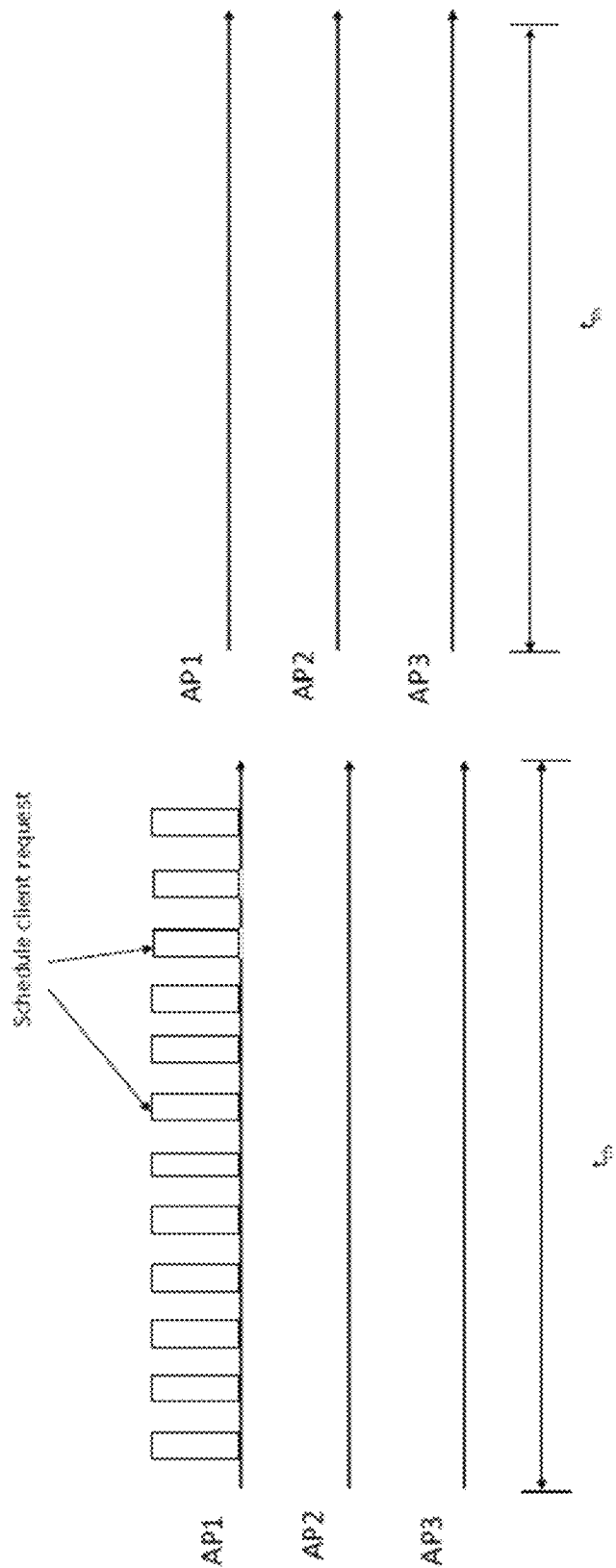

WI-FI ACCESS POINT COORDINATED TRANSMISSION OF DATA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates generally to the field of wireless networks, and specifically in one exemplary aspect, to apparatus and methods for access point coordination of data transmission within a wireless local area network. Various disclosed embodiments enhance wireless network systems with little or no involvement from or cognizance by client devices using the wireless network systems.

Description of Related Art

Wireless networking technologies enable wireless devices to communicate data with to one another. One common application for wireless technology is to provide network access to devices that are within a coverage area of a wireless network that is connected to the Internet. One such technology is Wi-Fi™ (IEEE Std. 802.11), which has become the de facto standard for wireless networking in consumer electronics. Wi-Fi enables multiple interconnected Access Points (APs, also commonly referred to as "hotspots") to provide coverage areas ranging from those as small as local coffee shops or residences, to entire corporate and academic campuses.

Commercially, Wi-Fi provides high value services in, for example, airports, hotels, and restaurants. Businesses and/or promotional events often provide Internet service to attract customers. Artisans of ordinary skill in the related arts will readily appreciate that typical wireless APs have an effective connectivity range on the order of one hundred (100) feet, depending on factors such as the presence or absence of buildings or other structures (and their materials of construction), and other interfering emitters. A typical home Wi-Fi network setup may include the user's client device in wireless communication with an AP (and/or a modem connected to the AP) that are in communication with the backend, where the client device must be within a certain range that allows the client device to detect the signal from the AP and conduct communication with the AP. Large coverage areas can be formed by grouping together a number of APs with overlapping coverage.

Although a single Wi-Fi network can have multiple APs, client devices (e.g., cell phones, laptops, tablets, etc.) are made to associate with one AP at a time. A wireless client device typically connects to a Wi-Fi network through one AP and continues to communicate with the network using only that AP, until it is forced to disconnect and disassociate—such as when the Access Point is turned off, or its signal becomes too weak to be viable—and find/associate with a different Access Point. This process places the burden of establishing a connection on the client device, and forces the client device to waste time disconnecting, searching through, and reconnecting to a wireless network.

Additionally, even if two or more APs are available to a client device, the client device will only receive and transmit data from the AP it is currently associated with. Moreover, communications between any given AP and the client are "half duplex" (i.e., only unidirectional at any given time). These factors can potentially lead to a network suffering an overloading or load imbalance condition, with some APs of that network having too much traffic (due to too many clients being associated with that particular AP), while other available APs are underutilized. To these ends, improved methods and apparatus are needed to coordinate wireless network traffic to/from multiple APs. Ideally, such improved methods and apparatus would also leverage extant protocols and hardware/firmware/software of APs and client devices so as to minimize or even eliminate the need for any modification to such devices.

SUMMARY

The present disclosure satisfies the foregoing needs by providing, inter alia, methods and apparatus for access point coordination of data transmission within a wireless local area network.

In a first aspect, an access point (AP) apparatus configured for use within at least one local area network is disclosed. In one embodiment, the AP apparatus includes: a wireless transceiver configured to utilize a wireless local area network (WLAN) air interface protocol; a processor apparatus in data communication with the wireless transceiver; and a storage apparatus in data communication with the processor apparatus and having a non-transitory computer-readable storage medium, the storage medium comprising at least one computer program having a plurality of instructions.

In one variant, the plurality of instructions are configured to, when executed by the processor apparatus, cause the AP apparatus to: receive at least one request issued from a wireless-enabled client device to the AP apparatus, the at least one request relating to transaction of at least user data between the AP apparatus and the wireless-enabled client apparatus; evaluate at least a portion of the received at least one request to determine at least a sufficiency of the AP apparatus to service the request; and based at least in part on the evaluation, cause: (i) generation of at least one message for transmission to a wireless apparatus associated with the at least one local area network, the at least one message comprising data relating to an association between the AP apparatus and the wireless-enabled client device, and configured to cause the wireless apparatus to utilize the data relating to an association to enable transaction of the at least user data between the wireless apparatus and the wireless enabled client device substantially in parallel with the transaction of the at least user data between the AP apparatus and the wireless-enabled client device; and (ii) transmission of the at least one message to the wireless apparatus.

In one implementation, the plurality of instructions are further configured to, when executed by the processor apparatus, cause the AP apparatus to maintain a registry or listing of at least a portion of AP apparatus within the at least one local area network. The AP apparatus to selects the wireless apparatus from the registry or listing. The selection of the wireless apparatus from the registry or listing is based, e.g., at least on algorithmic evaluation of one or more parameters associated with each of the at least portion of AP apparatus within the registry or listing, the one or more parameters selected from the group consisting of: (i) historical data relating to association with the wireless enabled client device; and (ii) current availability status.

In another implementation, the wireless apparatus comprises a commodity WLAN AP apparatus, and the at least one computer program of the AP apparatus comprises firmware disposed onto the AP apparatus after its manufacture.

In a further implementation, the transmission of the at least one message to the wireless apparatus comprises transmission via a wireline data network interface between the AP apparatus and the wireless apparatus. For instance, the wireline data network interface may be a protocol specifying network addresses for each of the AP apparatus and the wireless apparatus within the at least one local area network, and the transmission comprises transmission to a network address of the wireless apparatus.

In another implementation, the data relating to an association between the AP apparatus and the wireless-enabled client device comprises at least a BSSID (Basic Service Set Identifier) and passkey data.

In another aspect, a method of providing service to a client from two or more wireless access points is disclosed. In one embodiment, the method includes: associating the client device with a first access point; providing data regarding the association to a second access point; and utilizing the provided data in the second access point to provide concurrent service to the client from both the first and second access points. In one variant, the access points and client are all Wi-Fi (IEEE Std. 802.11) complaint, and the access points assume AP roles, while the client assumes an STA role. The provided data includes a passkey and BSSID (Basic Service Set Identifier) of the first AP thereby enabling the second AP to mimic or "clone" the operation of the first AP as far as interactions with the client/STA.

In one variant of the method, existing medium access/contention mechanism are used for providing data transmissions to/from the client from/to each of the participating APs. In another variant, at least the participating APs transact data with the client according to a prescribed mechanism asserted by controller logic (e.g., a TDMA or other approach).

In another aspect, a method of managing a wireless local area network (WLAN), using an Access Point coordination system, is provided. In one embodiment, the method includes: establishing a wireless local area network having an Access Point Controller (AP Controller) and a plurality of wireless Access Points (APs) having overlapping coverage, each AP capable of granting access into the WLAN; establishing a connection to the WLAN from at least one client device, the connection made through an association with one of the APs; and using the AP coordination system to fulfill requests from the at least one client device. In one embodiment, the WLAN is a Wi-Fi (i.e., IEEE Std. 802.11) compliant network.

In one variant, a client device creates an association with a first AP in the WLAN, and does not create an association with any other APs in the WLAN. In one implementation, the first AP transmits client device information and its own identification information to one or more other APs. In one such implementation, the first AP transmits the information to an AP Controller or other intermediary process, and the AP Controller distributes the information among the one or more other APs.

In another embodiment, the AP Controller assesses the APs within the WLAN with respect to client devices connected to the network. The assessment may include determining signal strength of an AP in relation to a client device. In one variant, the AP Controller creates a directory of viable/usable APs for each client device in the WLAN. In one implementation, the directory may be ranked by signal strength of the AP with respect to the client device, and/or other metrics such as known location of the client device relative to the known AP location, past or historical associations of the client with the given AP, or other. In one variant, the AP Controller periodically reassesses the APs with respect to the client devices and updates the directories. In another variant, the AP Controller only assesses the APs when prompted by an event, such as a client device request sent to the network.

In one embodiment, the method includes receiving a client device request at a first AP, and using two or more of the network APs (including the first AP) to fulfill the client request without forcing the client device to associate with any AP other than the first AP. The client device request may be a download or an upload request. In one variant, the method includes instructing all APs fulfilling the client request to utilize the identification information of the first AP. In one variant, the identification information is the BSSID of the first AP.

In yet another embodiment, the method includes sending client device request information and AP schedule information to an AP Controller, having the AP Controller process the client device request information and the AP schedule information, having the AP Controller create an optimized transmission schedule for the client request, and sending instructions, including the optimized transmission schedule, to one or more APs. In one embodiment, the instructions to each of the one or more APs are instructions to fulfill at least part of the client request at certain times slots. The instructions also contain identification/address information of the AP that the client device is associated with. In one implementation, fulfilling at least part of the client request includes transmitting data to the client device under the BSSID of the associated AP. In another implementation, fulfilling at least part of the client request includes accepting data sent to the BSSID of the associated AP from the client device.

In one embodiment, the optimized transmission schedule is made according to predetermined parameters. The parameters may include a threshold time, a threshold signal strength, the number of APs used in the operation, etc.

In a further embodiment, the method includes: having a first AP receive a request from a client device, determining that the first AP cannot fulfill the request within one or more prescribed parameters, identifying a second AP that can fulfill (the rest) of the request within the prescribed parameters, and using a combination of the first and the second APs fulfill the request in accordance with the prescribed parameters. In one embodiment, the determination and identification is made by an AP Controller. In another embodiment, at least part of the determination and identification is/are made by the first AP.

In a further embodiment, the method includes transmitting a frame protect passkey from a first AP to a second AP, the frame protect passkey including client device identification data, first AP identification data, and other data. In one variant, the first AP identification data is the BSSID (or MAC address) of the first AP, and the client device identification data is the MAC address of the client device. The other data can include security information, for example, any data/key/encryption protocol that has been previously established between first AP and client device, that would allow the second AP to imitate the first AP. In an implementation, the method includes transmitting scheduling information from a first AP to a second AP. Communication between a first and a second AP may be direct communication or made through/facilitated by an AP Controller and/or another network entity (e.g., a router).

In another aspect, a method of fulfilling a client device request within a Wireless Local Area Network is provided, including: receiving a client device request from a client device associated with a first Access Point (AP), processing the client device request, and fulfilling the client device request using one or more APs. In one variant, the one or more APs may or may not include the first AP. In one embodiment, the AP(s) fulfilling the client device request are masked under the BSSID of the first Access Point, such that the client device is unaware that it's connected to any AP other than the first AP.

In another aspect of the present disclosure, a WLAN system is provided. The WLAN system includes an Access Point Controller (AP Controller) and a plurality of wireless Access Points (APs) having overlapping coverage. In one embodiment, the AP Controller a stand-along device. In another embodiment, the AP Controller is integrated within one or more of the network entities (APs, router, modem, etc.). In one implementation, the AP Controller is physically located at the local premises. Alternately, the AP Controller is located remotely in the headend or backend of the infrastructure. The WLAN system is configured to provide AP coordination of transmissions to and from client devices within the system.

In another aspect of the present disclosure, an AP Controller apparatus is provided. In one embodiment, the controller apparatus is configured for use within a local area network, and to manage wireless traffic to a wireless-enabled device, and includes: a processor apparatus; and a storage apparatus in data communication with the processor apparatus and having a non-transitory computer-readable storage medium, the storage medium comprising at least one computer program having a plurality of instructions stored thereon.

In one variant, the plurality of instructions are configured to, when executed by the processor apparatus, cause the controller apparatus to: register and assess APs located in the local area network, accept client device requests (directly from client devices or through the APs), accept/obtain AP scheduling information, accept/obtain AP identification information, process client device requests in accordance with predetermined parameters and AP scheduling information, create optimized transmission schedules for client device requests, and transmit AP-instructions to APs. In an embodiment, the AP Controller includes a backend network interface and a WLAN network interface, and the AP-instructions are transmitted through the WLAN network interface. In an embodiment, the AP-instructions include the optimized transmission schedules and AP identification information. In one embodiment, the AP Controller a stand-along device. In another embodiment, the AP Controller is integrated within an AP, a router, and/or a modem.

In another aspect, a computer readable apparatus is disclosed. In one embodiment, the computer readable apparatus comprises a storage medium, the storage medium comprising at least one computer program having a plurality of instructions stored thereon. In one variant, the computer-readable apparatus is part of an AP Controller.

These and other aspects shall become apparent when considered in light of the disclosure provided herein.

BRIEF DESCRIPTION OF THE DRAWINGS

FIG. 4C is a logical block diagram of yet another exemplary AP coordination architecture useful with various embodiments of the present disclosure.

FIG. 8A is a logical flow diagram of an exemplary embodiment of a method to process a client device transaction of the method of FIG. 8.

FIGS. 9A-9B are graphical representations of exemplary time schedules for three WLAN APs, according to a first scenario.

FIGS. 10A-10D are graphical representations of exemplary time schedules for three WLAN APs, according to disclosure second scenario.

Figure 1:
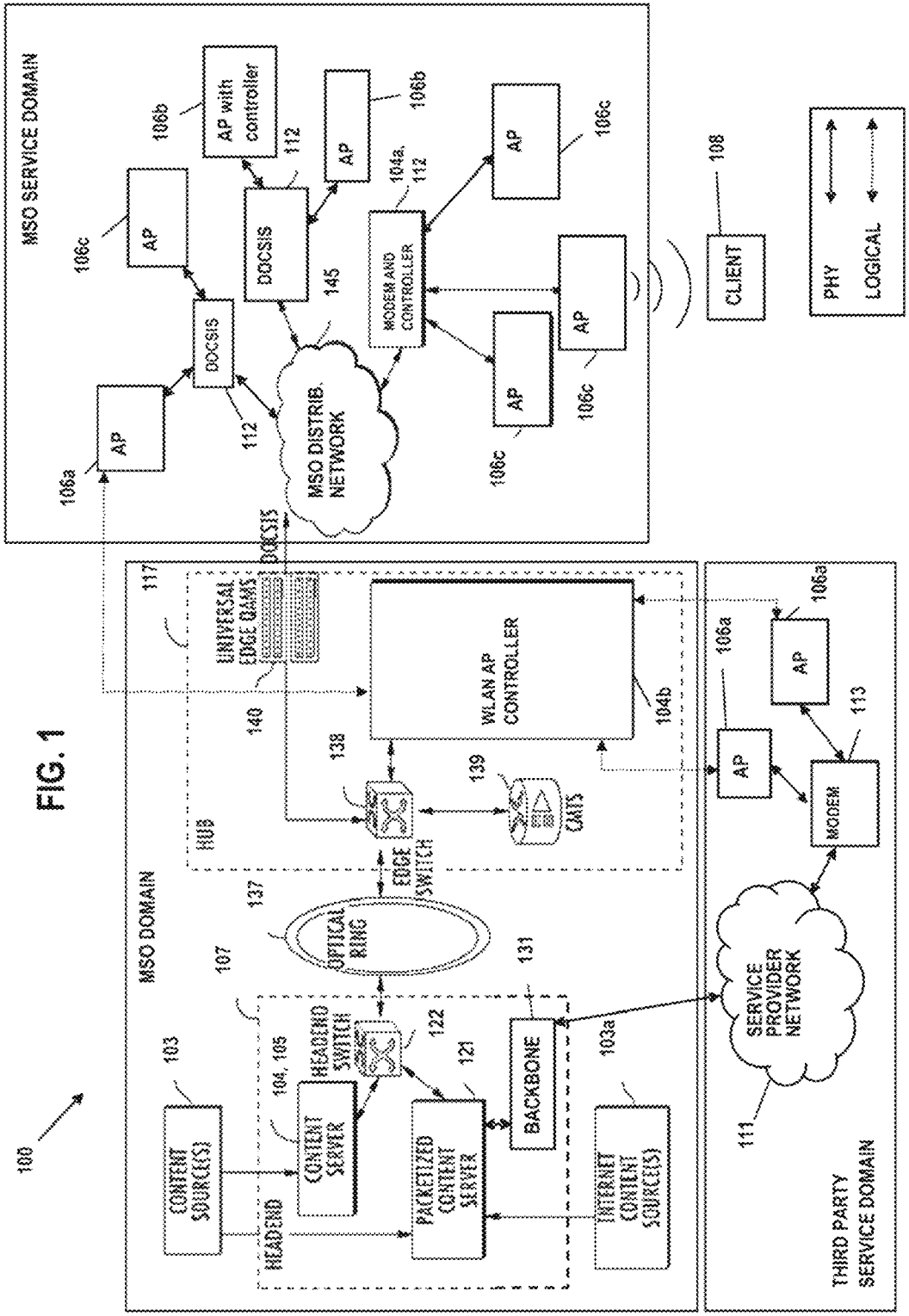
FIG. 1 is a functional block diagram illustrating an exemplary hybrid fiber coax network configuration useful with various aspects of the present disclosure.

All figures disclosed herein are © Copyright 2018-2019 Charter Communications Operating, LLC. All rights reserved.

DETAILED DESCRIPTION

Reference is now made to the drawings wherein like numerals refer to like parts throughout.

As used herein, the term "access point" refers generally and without limitation to a network node which enables communication between a user or client device and another entity within a network, such as for example a Wi-Fi AP, or a Wi-Fi-Direct enabled device acting as a Group Owner (GO).

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment or similar systems.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/ FPMS, RLDRAM, SRAM, "flash" memory (e.g., NAND/ NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, cellular or telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), 3GPP (LTE/LTE-A/5G NR), WiMAX (802.16), Zigbee®, Z-wave, PAN (e.g., 802.15), power line carrier (PLC), or IrDA families.

A used herein, the term "Wi-Fi" refers to, without limitation, any of the variants of IEEE-Std. 802.11 or related standards.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.) FHSS, DSSS, GSM, PAN/802.15, WiMAX (802.16), 802.20, Zigbee®, Z-wave, narrowband/FDMA, OFDM, PCS/DCS, LET/LET-A, 5G NR, analog cellular, CDPD, satellite systems, millimeter wave or microwave systems, acoustic, and infrared (i.e., IrDA).

Overview

In a Wi-Fi wireless network, multiple client devices (e.g., "STA" devices) can be connected to one AP. However, within a given period of time (e.g., in a one millisecond frame), the AP can only send data to or receive data from one client device. Moreover, since Wi-Fi communication is half-duplex communication, an AP or a client device cannot send and receive data simultaneously. Because of these limitations, even assuming a sufficiently high signal strength at the relevant receiver exists, a client device is often required to "back off" and wait to send a request or receive data, and as such a busy or highly congested AP may not be able to service all client requests, including with sufficient bandwidth to maintain QoE (quality of experience) or QoS (quality of service) requirements in a reliable fashion.

In a multi-AP system, if a first AP cannot service a client request due to e.g., congestion, another AP within range of the relevant client device might be able to provide a higher level of service. However, since client devices only communicate through one AP at a time under extant 802.11 protocols, dissociation of the client device from the first AP, acquisition of a suitable second AP, and subsequent association with the second AP, are all required. The current disclosure advantageously overcomes this disability by permitting logical aggregation of multiple Access Points that are communicative or capable of communication with a given client device, without forcing the client device to separately dissociate/associate with each of the multiple Access Points.

In one aspect, the present disclosure leverages the fact that Access Points (APs) within a given Wi-Fi network share the same network name or Service Set Identifier (SSID); each Access Point has its own unique Basic Service Set Identifier (BSSID), based on its Media Access Control (MAC) address, which serves as a unique identifier for the Access Point. A listing of all BSSIDs within the given network is called an Extended Basic Service Set Identifier (ESSID). In one embodiment, when a client device (e.g., STA) connects to a Wi-Fi network, it does so by associating with one Access Point (e.g., AP1 having a unique BSSID1) belonging to the network. Thereafter, the client device sends and receives data through one or more other wireless Access Points (AP2, AP3, etc.) by allowing these other AP's to "spoof" or clone the BSSID of AP1 (BSSID1) when communicating with the same client device. In other words, AP2 may transmit data to the client device under the credentials of BSSID1 such that the client device believes that the data is originated from AP1, when in fact it is physically transmitted via a separate air interface between AP2 and the client. Similarly, data sent by the client device to AP1 (to BSSID1) may be received by multiple APs within the system. In this way, handoff operations are completely obviated, and the client device is not required to disassociate from one Access Point in order to communicate with a second (and even third) Access Point in order to achieve the requisite increased data throughput.

Moreover, in some embodiments, the client/STA can advantageously be a simple commodity-type device; no modifications to the client (and hence the ubiquitous installed base of commodity client devices) are necessary, since extant medium access and contention resolution mechanisms are employed. The client in the exemplary embodiment simply sees transmission form the multiple APs as originating from a single AP, and likewise transmits data to the "single AP" when in fact such transmissions are received by the multiple participating APs (assuming all are within wireless range of the client).

In another variant, the foregoing extant access and contention resolution mechanisms are, at least from the AP side, replaced with a prescribed medium access scheme (e.g., TDMA slot schedule) so that each of the participating APs are instructed to at least transmit according to the schedule. In one implementation, the client advantageously need not be aware of this schedule or synchronize to it; it merely sees the transmissions from the multiple participating APs as transmissions from the same AP with which it associated, just in a prescribed sequence or timing. As such, contention or interference at the client from the multiple signals is largely avoided.

Service Provider Network

FIG. 1 illustrates a typical service provider network configuration useful with the features of the WLAN utilization apparatus and methods described herein. This service provider network 100 is used in one embodiment of the disclosure to provide backbone and backhaul from the service provider's service nodes, such as HFC cable or FTTC/FTTH drops to different premises or venues/residences. For example, one or more stand-alone or embedded DOCSIS cable modems (CMs) 112 are in data communication with the various WLAN architecture components (e.g., AP's and controllers, if used) as described in greater detail below, so as to provide two-way data communication to the served components.

In certain embodiments, the service provider network 100 also advantageously permits the aggregation and/or analysis of subscriber- or account-specific data (including inter alia, particular AP or controller devices associated with such subscriber or accounts) as part of the provision of services to users under the exemplary delivery models described herein. As but one example, device-specific IDs (e.g., BSSID, MAC address or the like) can be cross-correlated to MSO subscriber data maintained at e.g., the network head end(s) 107 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

The MSO network architecture 100 of FIG. 1 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 1 may deliver Internet data and OTT (over-the-top) services to the end users (including those of the AP's 106a-c) via the Internet protocol (IP) and TCP (i.e., over the WLAN radio bearer), although other protocols and transport mechanisms of the type well known in the digital communication art may be substituted. The network architecture 100 of FIG. 1 generally includes one or more headends 107 in communication with at least one hub 117 via an optical ring 137. The distribution hub 117 is able to provide content to various "client" devices (e.g., APs 106a-c), via modem/gateway devices as applicable, via an interposed network infrastructure 145. It will be appreciated from examination of FIG. 1 that the various WLAN APs may each act as a "client" device of the network. For example, in some installations, the controller 104 of a given AP is physically disparate or removed from the locations of its constituent AP's 106, and a (e.g., wired, wireless, optical) PHY bearer is needed to communicate control data between the controller and their constituent APs, as well as a backhaul for the APs to the core/backbone for user data/plane functions. In one such architecture, the controller 104b (where used) may be placed further toward the core of the MSO distribution network, while the various constituent AP's are placed at the edge. Alternatively, both devices 104a, 106 may be near the edge (and e.g., served by edge QAMs or RF carriers 140 as shown in FIG. 1). In both cases, the MSO infrastructure may be used to control and user data from each device and communicate it to, via the MSO infrastructure, the other components, much as two geographically disparate customers of a given MSO might communicate data via their respective DOCSIS modems in their premises. Each component has an IP address within the network, and as such can be accessed by the other components.

Moreover, a given controller and its AP's may be co-located (i.e., physically and logically integrated) as desired, as shown by the combined units 106b in FIG. 1. This may also be "hybridized," such as where one constituent AP is co-located (and potentially physically integrated) with the controller, while the remaining AP's of that controller are geographically and physically distributed and may or may not have controller logic.

Accordingly, different AP/controller scenarios are shown in FIG. 1 for purposes of illustrating the possible diversity of installations and operation consistent with the present disclosure. These include: (i) installations with at least one commodity AP 106c and at least one remotely (network) controlled AP 106a; (ii) installations with at least one commodity AP 106c and at least one controller-enabled AP 106b; and (iii) installations with all commodity APs 106c and a local controller 104a.

In the MSO network 100 of FIG. 1, various content sources 103, 103a are used to provide content to content servers 104, 105 and origin servers 121. For example, content may be received from a local, regional, or network content library as discussed in co-owned U.S. Pat. No. 8,997,136 entitled "APPARATUS AND METHODS FOR PACKETIZED CONTENT DELIVERY OVER A BAND-WIDTH-EFFICIENT NETWORK", which is incorporated herein by reference in its entirety. Alternatively, content may be received from linear analog or digital feeds, as well as third party content sources. Internet content sources 103a (such as e.g., a web server) provide Internet content to a packetized content origin server(s) 121. Other IP content may also be received at the origin server(s) 121, such as voice over IP (VoIP) and/or IPTV content. Content may also be received from subscriber and non-subscriber devices (e.g., a PC or smartphone-originated user made video).

The network architecture 100 of FIG. 1 may further include a legacy multiplexer/encrypter/modulator (MEM; not shown). In the present context, the content server 104 and packetized content server 121 may be coupled via a LAN to a headend switching device 122 such as an 802.3z Gigabit Ethernet (or "10G") device. For downstream delivery via the MSO infrastructure (i.e., QAMs), video and audio content is multiplexed at the headend 107 and transmitted to the edge switch device 138 (which may also comprise an 802.3z Gigabit Ethernet device) via the optical ring 137.

In one exemplary content delivery paradigm, MPEG-based video content (e.g., MPEG-2, H.264/AVC) may be delivered to user IP-based client devices over the relevant physical transport (e.g., DOCSIS channels and WLAN bearer of the respective AP 106); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast.

Individual devices such as cable modems 112 and associated APs 106 and controllers 104 (where used) of the implementation of FIG. 1 may be configured to monitor the particular assigned RF channel (such as via a port or socket ID/address, or other such mechanism) for IP packets intended for the client or subscriber premises/address that they serve. The IP packets associated with Internet services are received by edge switch, and forwarded to the cable modem termination system (CMTS) 139. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the "client" WLAN devices. The IP packets are typically transmitted on RF channels that are different than the "in band" RF channels used for the broadcast video and audio programming, although this is not a requirement.

In one implementation, the CMs 112 shown in FIG. 1 each service a premises or venue, such as user premises, an apartment building conference center or hospitality structure (e.g., hotel), which includes one or more AP nodes for provision of WLAN services (e.g., 802.11-2016 compliant Wi-Fi) nodes for WLAN access within 2.4 GHz ISM band, or even E-UTRAN femtocells, CBRS (Citizens Broadband Radio Service) nodes, or other such devices.

In parallel with (or in place of) the foregoing delivery mechanisms, the MSO backbone 131 and other network components can be used to deliver packetized content to the "client" WLAN devices 104, 106 via non-MSO networks. For example, so-called "OTT" content (whether tightly coupled or otherwise) can be ingested, stored within the MSO's network infrastructure, and delivered to the AP via an interposed service provider network (which may include a public Internet) 111 (e.g., at a local coffee shop, via a WLAN AP connected to the coffee shop's service provider via a modem, with the user's IP-enabled end-user device 108 utilizing an Internet browser or MSO/third-party app to stream content according to an HTTP-based approach over the MSO backbone 131 to the third party network to the service provider modem 113 (or optical demodulator) to the AP, and to the user device via the AP wireless interface.

Access Point Architecture

Figure 2A:
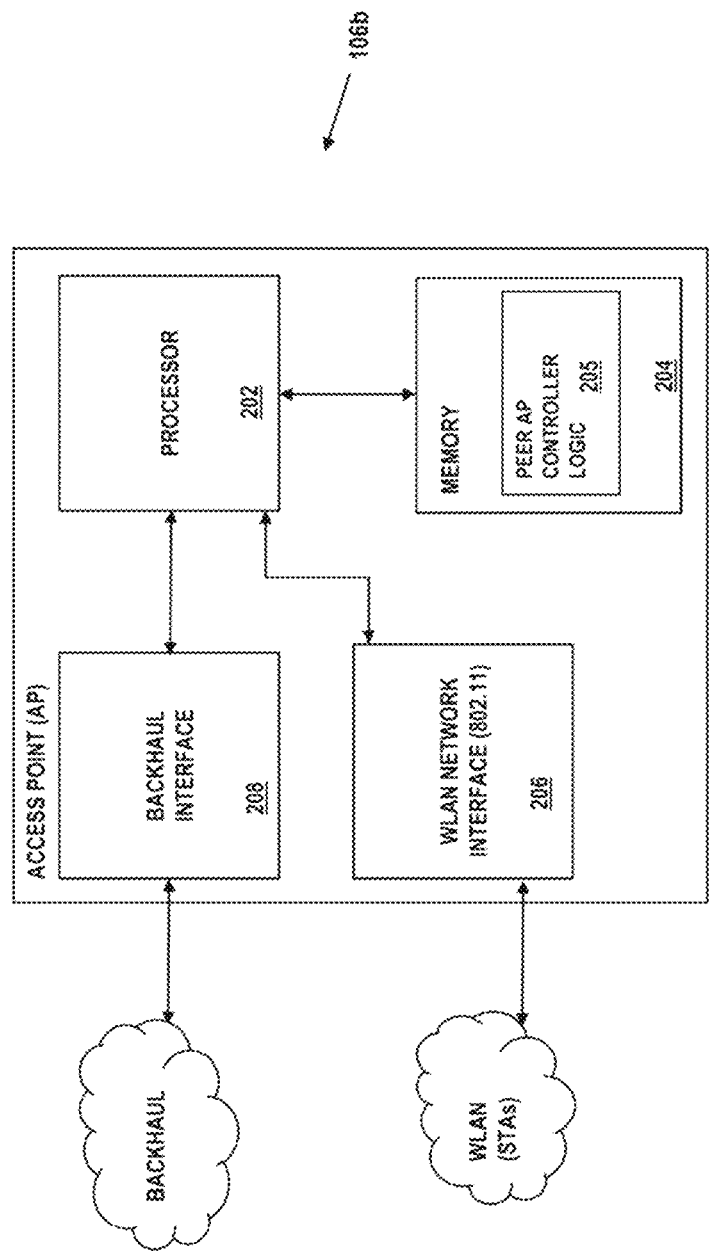
FIG. 2A is a functional block diagram of one embodiment of a peer-enabled Access Point (AP) apparatus according to the present disclosure.

FIG. 2A illustrates one exemplary wireless Access Point 106b according to the present disclosure. As shown, the exemplary access point device includes: a processor subsystem 202, a memory module 204 with peer controller logic 205, a WLAN network interface 206, and a backhaul interface 208.

In one exemplary embodiment, the processor 202 may include one or more of a digital signal processor, microprocessor, field-programmable gate array, or plurality of processing components mounted on one or more substrates. The processor subsystem 202 may also comprise internal cache memory (e.g., L1/L2/L3 or other types of cache). The processor subsystem is in communication with a memory subsystem 304, the latter including memory which may for example comprise SRAM, flash, and/or SDRAM components, or even "3D" memory arrays. The memory subsystem may implement one or more of DMA-type hardware, so as to facilitate data accesses as is well known in the art.

The processor subsystem 202 is configured to execute at least one computer program stored in memory 204 (e.g., non-transitory computer readable storage media). The computer program may include a plurality of computer readable instructions configured to establish, monitor, and maintain a backhaul access link. As described in greater detail elsewhere herein, the memory may contain logic (e.g., one or more programs) 205 configured to implement peer controller functions, including aggregation of two or more co-located or proximate APs under a common BSSID/passkey.

In one embodiment, the WLAN interface is an 802.11-compliant client (e.g., STA) interface 206 (e.g., Wi-Fi interface) and is configured to transact one or more data with one or more wireless devices. Each client device of the wireless access point has an address (e.g., an IP address) that is unique within the wireless network; the address can be used to communicate with the corresponding device. In more complex networks, addresses may be logically divided into ranges of network addresses, etc.

In one implementation of the wireless access point 106b, the backhaul interface 208 is configured to enable the AP 106b to: (i) register with an upstream backhaul access point and/or access point controller (such as the AP controller 104a or 104b in FIG. 3A or FIG. 3B, respectively); and (ii) manage backhaul link connectivity to support network connectivity for its wireless clients. In one exemplary embodiment, registration of the access point includes registration with an access point registry service provided by a wireless network. In one exemplary embodiment, the registration includes authenticating and authorizing the access point to the service provider's network. On successful authentication and authorization, the access point is enabled/instructed to provision hotspot functionality for its wireless clients. In one variant, the access point provisions network service in accordance with information provided by the service provider's network. For example, the network may specify an SSID for the access point. In another example, the network may instruct the access point to operate a completely independent sub-network (with a unique SSID), etc. In one embodiment, the service provider's network may provide instructions to the access point through an access point controller.

In one exemplary embodiment, the client interface 206 and backhaul interface 208 of the device 106b of FIG. 2A comprise one or more wireless radio interfaces. In some variants, the client interface and the backhaul interface are physically distinct; in other variants, the interfaces are logically performed over the same physical radio interface (e.g., time and/or frequency multiplexed). Generally, a radio interface incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (Multiple Input Multiple Output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (Single In, Single Out), SIMO (Single In, Multiple Out), and MISO (Multiple In, Single Out) antenna schemes may be substituted with equivalent success.

In one embodiment the backhaul interface 208 of the device of FIG. 2A comprises a wired interface (e.g., GbE, 10G, or similar) that connects to a modem, router, gateway, AP controller, or other service node of a backhaul network. While the present disclosure is primarily directed to Ethernet implementations compliant with IEEE 802.3, artisans of ordinary skill in the related arts, given the contents of the present disclosure, will readily appreciate that the various principles described herein are readily applicable to any wired interface, including but not limited to: FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), etc.

In this embodiment of the AP 106b, the AP includes peer AP controller logic 205, which is configured to enable the AP to generate messages for transmission to one or more other APs within a given served area or premises including data to enable the recipient AP(s) to implement "cloning" of the transmitting AP's BSSID and passkey data, such that the recipient APs can function in effect as alter-egos of the transmitting AP and operate concurrently therewith with respect to each served client.

In one exemplary implementation, communication between the AP peers is accomplished via an Ethernet (e.g., GbE) or other LAN wireline connection existing between the APs, such as via a common router or modem with which the two APs are in data communication. Alternatively, the present disclosure contemplates at least one of the peer APs, when communicating with its designated peer "controller" AP, acting as an STA device (with the peer controller acting as an AP), such that the coordination data (e.g., BSSID and passkey data) can be transmitted from the controller to the recipient or "minion" AP via a wireless channel between the two devices (i.e., using an 802.11 air interface channel). In another variant, the recipient STAs are each configured to act as both an AP and STA (i.e., AP for serving the target client(s), and STA for transaction of data with the transmitting AP, including the generated messaging with the BSSID and passkey data). This approach obviates a separate wireline (e.g., Ethernet) data connection between the two (or more) APs acting in the aggregate.

In yet other embodiments, the AP's may be equipped with alternate communication channels (such as Bluetooth or BLE, or another PAN interface such as IEEE Std. 802.15.4).

Figure 2B:
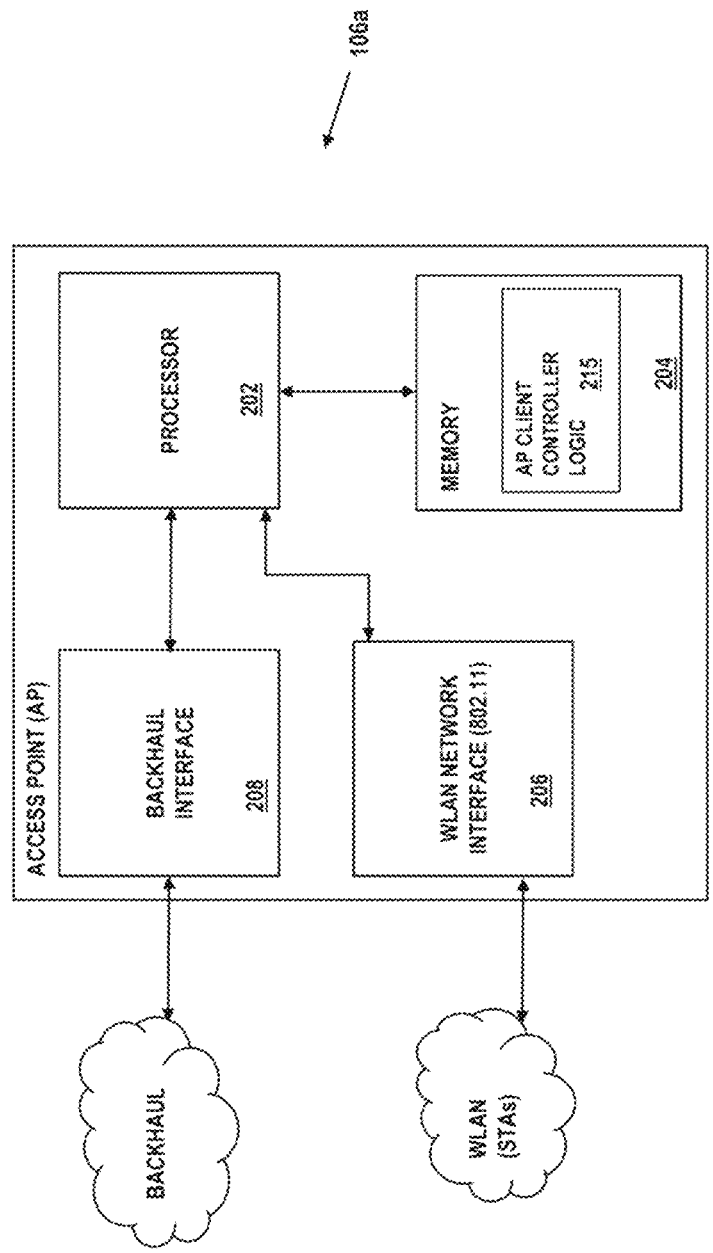
FIG. 2B is a functional block diagram of one embodiment of a network-enabled Access Point (AP) apparatus according to the present disclosure.

FIG. 2B illustrates another embodiment of the AP of the present disclosure, wherein the AP 106a includes client controller logic 215 which acts as a logical client to network-based "server" controller logic within a separate local or cloud-based controller 104a, 104b with which the AP 106a is in logical communication. In this fashion, the client controller logic 215 acts as a "minion" of the "master" network controller 104a, 104b during operation, including allocation of BSSID and passkey values as described herein during periods when multi-AP data transmissions with one or more clients are utilized.

Also, as discussed below in greater detail, while the data backhaul and interface 208 used by the AP is in many embodiments described herein also used for logical communications between the client controller logic 215 and the network controller logic 104a, 104b, it is also envisaged that separate physical channels may be used for the communication between the controller entities, depending on their placement within the architecture. This is particularly true of the network controller logic is not within the backhaul pathway of the relevant AP(s).

Figure 3A:
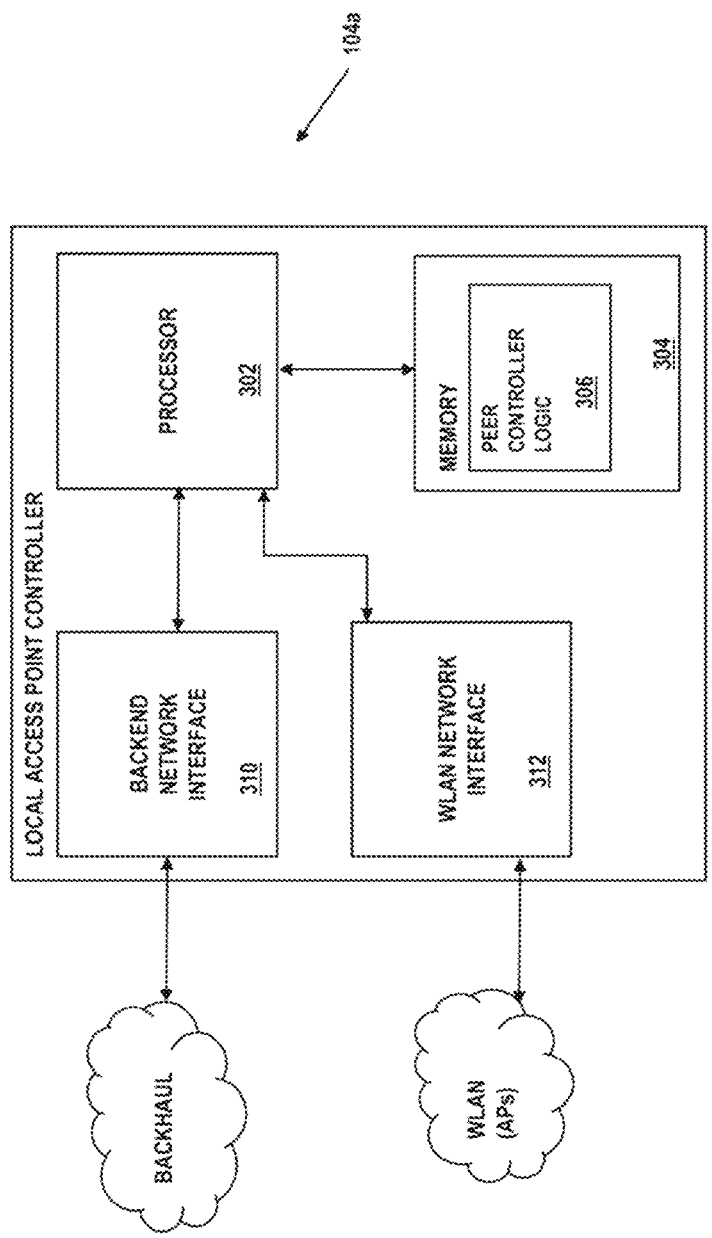
FIG. 3A is a functional block diagram of one embodiment of a local wireless Access Point controller apparatus according to the present disclosure.

FIG. 3A illustrates one exemplary embodiment of a local Access Point (AP) Controller 104a according to the present disclosure. As shown, the AP controller 104a includes: a processor 302, a memory module 304, a peer controller (PC) 306, a backend (e.g., backhaul) network interface 310, and a WLAN network interface 312. The foregoing apparatus being purely illustrative, artisans of ordinary skill in the related arts will readily appreciate, given the present disclosure, that the AP Controller may be a stand-alone device, virtualized and/or distributed within other network entities (e.g., within a router or modem), or be distributed within one or more of the WLAN APs. Moreover, in deployment scenarios where an access point operates in a stand-alone manner without an overarching network of access points (e.g., consumer premises may only have a single AP, etc.), it is readily appreciated that a single AP may execute the complementary PC logic 306.

At a high level, the exemplary local controller 104a of FIG. 3A utilizes its PC logic 306 to control two or more peer APs within a given WLAN, such as at a user's premises or an enterprise or venue. The controller may for example be a standalone box, or integrated with e.g., DOCSIS modem providing backhaul for the premises, or a network router. It communicates with the peer APs within the WLAN over which it is cognizant via the WLAN network interface 312, which may also include backhaul or other functionality as well.

In one exemplary embodiment, the processor 302 may include one or more of a digital signal processor, microprocessor, field-programmable gate array, or plurality of processing components mounted on one or more substrates. The processor 302 may also comprise an internal cache memory. The processing subsystem is in communication with a memory subsystem 304, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 302 is configured to execute at least one computer program stored in memory 304 (e.g., non-transitory computer readable storage media). The computer program may include a plurality of computer readable instructions configured to perform the complementary logical functions of a peer controller (PC) 306. Other embodiments may implement such functionality within dedicated hardware, logic, and/or specialized co-processors (not shown). For instance, the peer controller (or portions of the functionality thereof) can be located in one or more MSO data centers, and/or in other "cloud" entities (whether within our outside of the MSO network).

In one embodiment, the local AP controller 104a (including PC 306) is configured to register wireless client devices 108, register and communicate with wireless APs, evaluate the APs in relation to the client devices, and manage WLAN traffic between the client devices and the APs. For example, the AP controller 104a may receive a request from a client device attempting to send/receive data through a first AP and allocate the request to at least one other AP. This process is discussed in detail later in the present disclosure.

In one embodiment, the complementary PC 306 is further configured to communicate with one or more authentication, authorization, and accounting (AAA) servers of the core network. The AAA servers are configured to provide, inter alia, authorization services and facilitate tracking and/or control of network subscribers for intelligently controlling access to computer resources, enforcing policies, auditing usage, and providing the information necessary to bill for services. In some variants, authentication processes are configured to identify a subscriber, typically by having the subscriber enter a valid user name and valid password before access is granted.

In one embodiment, the backend network interface 310 is configured to transact one or more network address packets with other networked devices according to a network protocol. Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.) The network interface 310 operates in signal communication with the backbone of the content delivery network (CDN), such as that of FIG. 1. This interface might comprise for instance GbE (Gigabit Ethernet) or other interfaces of suitable bandwidth capability.

The WLAN interface 312 is utilized in the illustrated embodiment for communication with the WLAN APs, such as via Ethernet or other data network protocols. It will also be appreciated that the two interfaces 310, 312 may be aggregated together and/or shared with other extant data interfaces.

Figure 3B:
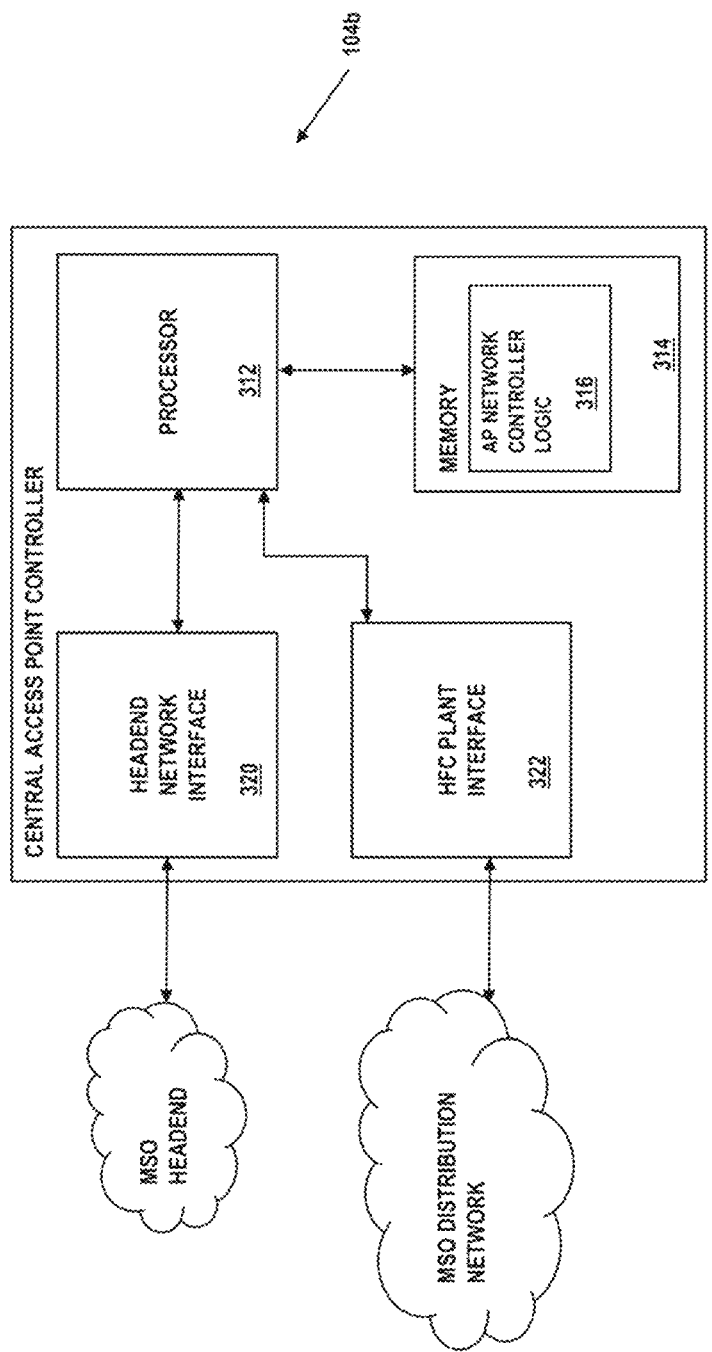
FIG. 3B is a functional block diagram of one embodiment of a network or centralized wireless Access Point controller apparatus according to the present disclosure.

FIG. 3B illustrates one exemplary embodiment of a network (e.g., core or cloud) network controller 104b according to the disclosure. As shown, the AP controller 104b includes: a processor 312, a memory module 314, an AP network controller (NC) 316, a headend or core LAN network interface 320, and a hybrid fiber coaxial (HFC) plant interface 322. The foregoing apparatus being purely illustrative, artisans of ordinary skill in the related arts will readily appreciate, given the present disclosure, that the network AP Controller may be a stand-alone device, virtualized and/or distributed within other core network entities (e.g., within a router or modem), or be distributed within one or more of the WLAN APs.

At a high level, the exemplary network controller 104b of FIG. 3b utilizes its NC logic 316 to control two or more APs within a given WLAN under its control, such as at a user's premises or an enterprise or venue. The controller may for example be a standalone box, or integrated with e.g., CMTS devices, or other network components depending on placement. It communicates with one or more "controlled" APs within the WLAN over which it is cognizant via the HFC interface 322, which may also include content distribution or Internet service or other functionality as well.

In one exemplary embodiment, the processor 312 may include one or more of a digital signal processor, microprocessor, field-programmable gate array, or plurality of processing components mounted on one or more substrates. The processor 312 may also comprise an internal cache memory. The processing subsystem is in communication with a memory subsystem 314, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 312 is configured to execute at least one computer program stored in memory 314 (e.g., non-transitory computer readable storage media). The computer program may include a plurality of computer readable instructions configured to perform the complementary logical functions of the network controller (NC) 316. Other embodiments may implement such functionality within dedicated hardware, logic, and/or specialized co-processors (not shown).

In one embodiment, the network AP controller 104b (including NC 316) is similarly configured to register wireless client devices 108, register and communicate with wireless APs, evaluate the APs in relation to the client devices, and manage WLAN traffic between the client devices and the APs. For example, the AP controller 104b may receive data relating to a request from a client device attempting to send/receive data through a first AP within its controlled group, and allocate the request to at least one other AP. In one embodiment, the NC 316 is further configured to communicate with one or more authentication, authorization, and accounting (AAA) servers of the core network. The AAA servers are configured to provide, inter alia, authorization services and facilitate tracking and/or control of network subscribers for intelligently controlling access to computer resources, enforcing policies, auditing usage, and providing the information necessary to bill for services. In some variants, authentication processes are configured to identify a subscriber, typically by having the subscriber enter a valid user name and valid password before access is granted.

In one embodiment, the headend network interface 320 is configured to transact one or more network address packets with other networked devices within the MSO domain (e.g., via MSO LAN or intranet) according to a network protocol. Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.) The network interface 320 operates in signal communication with the MSO LAN. This interface might comprise for instance GbE (Gigabit Ethernet) or other interfaces of suitable bandwidth capability.

The HFC plant interface 322 is utilized in the illustrated embodiment for communication with the WLAN APs, whether via the HFC plant (e.g., packetized protocols carried over in-band or OOB channels), or via another communication bearer. It will also be appreciated that the two interfaces 320, 322 may be aggregated together and/or shared with other extant data interfaces, such as in cases where the controller entity function is virtualized within another component, such as an MSO network server performing other functions.

Figure 4A:
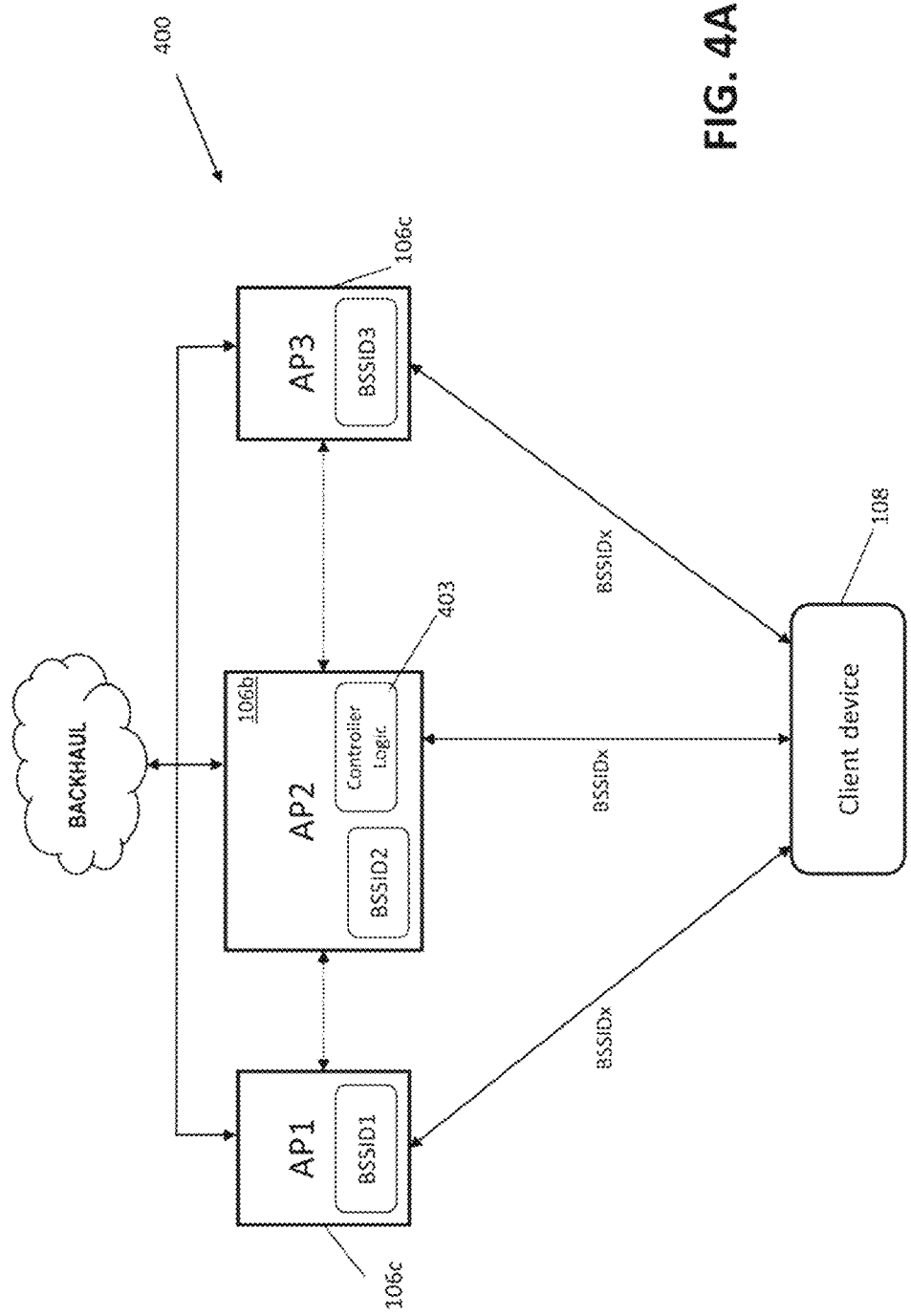
FIG. 4A is a logical block diagram of an exemplary AP coordination architecture useful with various embodiments of the present disclosure.

FIG. 4A shows a first exemplary architecture of an AP coordination system 400 according to the present disclosure. In this architecture, the AP controller 403 is capable of performing all the tasks of an AP. That is, controller logic 403 is integrated with the AP (AP2 in this scenario) and hence has its own connectivity range to service client devices directly. As shown, the individual APs (AP1, AP2, and AP3) each are associated with a common network ID (SSID), and each maintain their own unique BSSID values (BSSID1, BSSID2, and BSSID3 respectively) for "normal" or non-tandem operation as described herein; these BSSID values are, during tandem operation, merged into one BSSID (typically that of the AP with the controller logic such as AP2, but this is not a requirement) such that the client 108, during such tandem operation, sees each of the participating or aggregated APs as having a common BSSID (BSSIDx in FIG. 4A) as well as common passkey data.

It is noted that in general, several mechanisms exist for communication between WLAN APs, including those indigenous the protocol or underlying network apparatus. One such mechanism for communication between the APs is a DS (Distributed System) using IEEE Std. 802.3 (e.g., Ethernet), such as via RJ-45/CAT-5/6 cabling between the APs via an interposed router or other networking infrastructure. Advantageously, using this mechanism, no substantive firmware or hardware modifications are needed for the receiving or "minion" AP, and hence commodity/OEM devices may be effectively repurposed by the techniques described herein for "aggregated" operation under e.g., a common BSSID/passkey.

In one or more embodiments, each AP 106b, 106c is located within and/or services a designated area (e.g., a building, room, or plaza for commercial, corporate, academic purposes, and/or any other space suitable for Wi-Fi access). Each AP is configured to provide wireless network coverage within its coverage or connectivity range. The combined coverage of the wireless connectivity provided by APs is configured to provision network access to a so-called "open" Internet or intranet. More generally, artisans of ordinary skill in the related arts will readily appreciate that the combined coverage of the wireless networks provides uncontrolled (but limited) network access to any client device. In some variants, access to the network requires a client device to enter valid credentials (e.g., username and password, or Globally Unique Identifier (GUID)). In another variant, such access does not require authorization or authentication for the provision of limited services only.

Figure 4B:
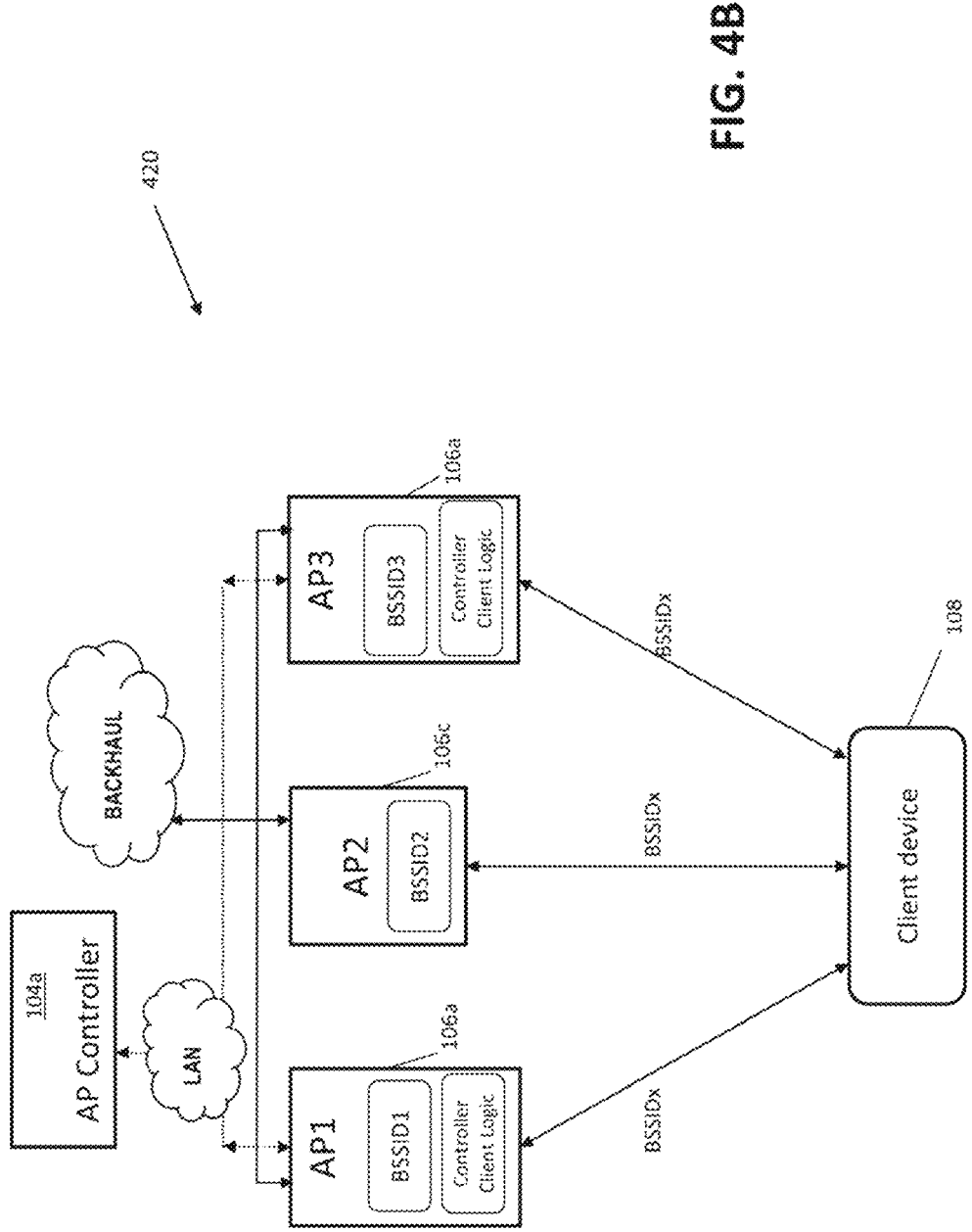
FIG. 4B is a logical block diagram of another exemplary AP coordination architecture useful with various embodiments of the present disclosure.

FIG. 4B illustrates another exemplary AP coordination system architecture 420 useful in practicing various aspects of the present disclosure. In one exemplary embodiment, a local network includes one or more APs 106b, 106c serving one or more client devices 408 within the serviced area(s). At least one AP controller 104a operated by a service provider (which may be located on-site or remotely in the headend or backend of the infrastructure) communicates with at least some of the APs (e.g., those shown with the local controller client logic 403) to provide information to be distributed to client devices 408. Communications between the AP controller 104a and the relevant AP(s) may be accomplished through a wired network (e.g., LAN, backhaul infrastructure) and/or through a wireless network (e.g., WLAN serviced by Wi-Fi connections). In one or more embodiments of the network, the information provisioned by the AP controller 104a may include, depending on configuration: (i) client device address/identification (e.g., MAC addresses), (ii) AP address/identification (e.g., BSSID), (ii) client request information, (iii) security key(s) or cryptographic data, (iv) AP schedule information, and/or (v) various network parameters (bandwidth, quality of service, etc.). Depending on the needs and demands of AP(s) and the services employed by the AP(s), myriad types of information, and in fact literally any type of digital data, can be transferred to, and be used by the AP(s), via the exemplary AP coordination system 420. In an exemplary embodiment, the AP Controller 104a collects information relating to the APs, client devices, and client device requests made within the Wi-Fi network. The AP controller may process the collected information, and instruct the APs to fulfill the client requests according to a transmission schedule provided by the AP Controller, as described in greater detail subsequently herein.

In one or more exemplary embodiments of the system 420, the APs are associated with one SSID (one network name) and each AP has its own unique BSSID, as in the system 400 of FIG. 4A. The network-based AP controller 104a may instruct any of the (participating) APs to transact data with a client device 408 while aggregated under the BSSID of a different AP. In another embodiment, at least some of the APs may be associated with more than one SSID, and the AP coordination protocols of the present disclosure may be internally applied within each SSID.

In one embodiment of the present disclosure, all WLAN APs and client devices operate on or within a prescribed set of channels. In another embodiment, some APs may operate using multiple channels. In this case, one implementation of the controller 104a is configured to issue a "change channel" request or command that may be sent to a client device or to a participating AP.

FIG. 4C illustrates yet another embodiment of the architecture 440 according to the present disclosure. In this embodiment, the network controller 104b is "cloud" based; i.e., disposed at a remote location such as within the MSO core network (see FIG. 1 and discussion of FIG. 3B). Data communication between the participating WLAN AP's and the controller 104b is accomplished in one embodiment via the network backhaul between the APs and the core (i.e., that used to backhaul the user plane traffic of the APs), such as via a control channel, OOB channel, or other dedicated or shared bearer available for such purposes, although other communication channels may be used as well.

Although FIGS. 4A-4C show three APs, this is merely illustrative, and a different number of APs may be used within the AP coordination system architectures 400,420.

Based on the foregoing architectures, various embodiments of the present disclosure are directed to enabling a client device 108 to send and receive data from multiple APs even while maintaining an "association" with only one AP (i.e., via tandem or aggregated operation). Specifically, in one embodiment, a client device 108 may initially connect to the local area network by associating with one AP (e.g., AP1 having BSSID1), and thereafter send and receive data through other APs of that network (e.g., AP2, and AP3, as well as AP1) without associating with any of the other APs (i.e., without negotiating separate connections or sessions with the other APs). The client device in such tandem or aggregated operation does not realize that it is connected to AP2 and AP3, since AP2 and AP3 use the identity of AP1 (BSSID1), and the cryptography negotiated between AP1 and the client, to interact with the client device. In this way, the client device in an exemplary embodiment advantageously requires no extra software (e.g., applications software, or firmware) over its normal commodity configuration, and is unaware of the AP transmission coordination taking place within the WLAN system.

Notwithstanding, that the present disclosure contemplates the client device (e.g., smartphone, tablet, laptop) having an installed or downloaded application or "app" or firmware update comprising, e.g., an application programming interface (API), that allows the client device to more actively participate in the AP transmission coordination. That is, a common protocol or compatible API (enabled by, e.g., an application available from the service provider operating the AP/controller, the user's "host" service provider (e.g., an MSO) who has access to the AP/controller, etc.) among the client devices, AP(s), and/or AP Controller may allow for more effective coordination/scheduling of data transmissions within a Wi-Fi network. In one such scenario, the controller 104a or its proxy may make an API call to the client device 108 to obtain various types of information from the client relating to status (e.g., WLAN parameter or link status, signal strength, etc.), capabilities, and/or pending requests. Conversely, the client device application or firmware may make API calls to e.g., the controller or a proxy (e.g., a networked server of the MSO or another entity) to obtain useful or required data, including for effecting the aggregated operation described above.

In another variant, the controller 104a may act as a conduit for data intended to be transmitted to and from APs; i.e., be "in line" entities within the data path of the APs. Typically, control traffic is routed from the APs to their controllers. User traffic can optionally be routed through the controller, or pointed directly to the Internet depending on the deployment scenario.

Figure 5:
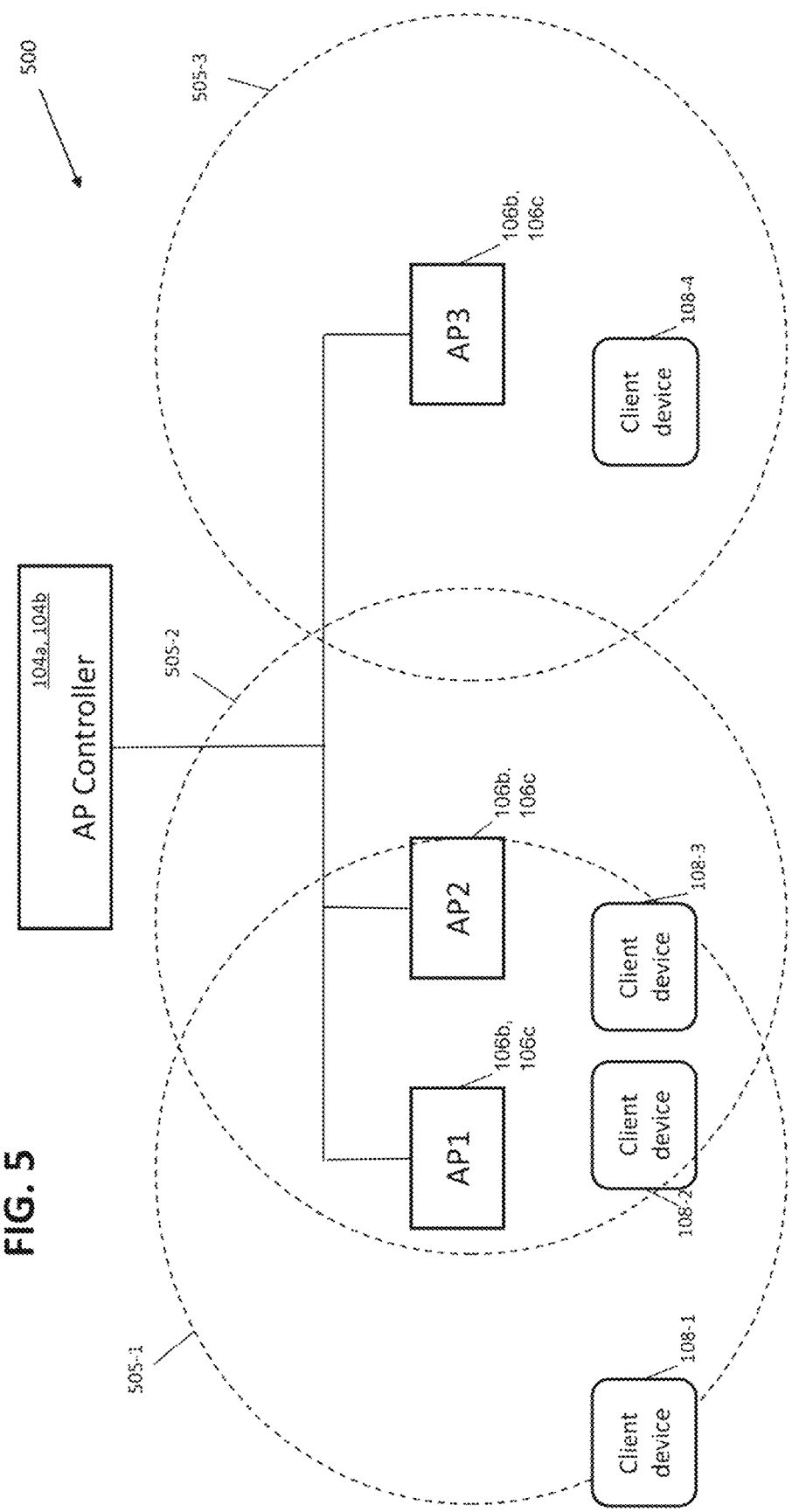
FIG. 5 is a graphical representation of one exemplary embodiment of a wireless local area network (WLAN) according to various embodiments of the present disclosure, showing AP coverage areas.

FIG. 5 illustrates an exemplary embodiment of a wireless network 500 having an associated AP controller 104a, 104b and access points AP1 106b, 106c, AP2 106b, 106c, and AP3 106b, 106c. In various embodiments, each AP has a limited connectivity range or area 505-1/505-2/505-3 as determined by e.g., RSSI at the recipient client device. As shown, some client devices are within the connectivity range of one or more APs, but not within connectivity range of other APs. For example, some client devices 108-1/108-4 are within range of only one AP; other client devices 108-2/108-3 are within range of two APs and may be serviced by one or both. The AP Controller 104a, 104b is aware of the connectivity range of each AP as it relates to the client devices, and may schedule network traffic accordingly. For example, the AP controller may receive a request from one client device 108-2, and instruct AP1 and AP2, but not AP3, to fulfill the request.

It will be appreciated, however, that in some embodiments of the disclosure, such AP selection for participation in tandem/aggregated operation may be completely driven by the client. For instance, in one such approach, each of the APs shown in FIG. 5 may be open to becoming part of an aggregate (whether by affirmative instruction from controller logic in the network controller 104a, 104b, or even another "peer" AP as in FIG. 4A, or by virtue of logic within the firmware of each AP itself), but the client may not be within range or otherwise have adequate connectivity to that given AP, and hence will not attempt to associate with it (e.g., transmitted probe requests are never received or replied to). As such, that AP will never form an association with that client using the shared BSSID (e.g., BSSIDx) and passkey data, but rather will form associations with the other APs that are within range of it. Hence, the client device 108 in effect selects which APs participate in the aggregation merely by virtue of its physical position within the WLAN relative to each AP.

Figure 6A:
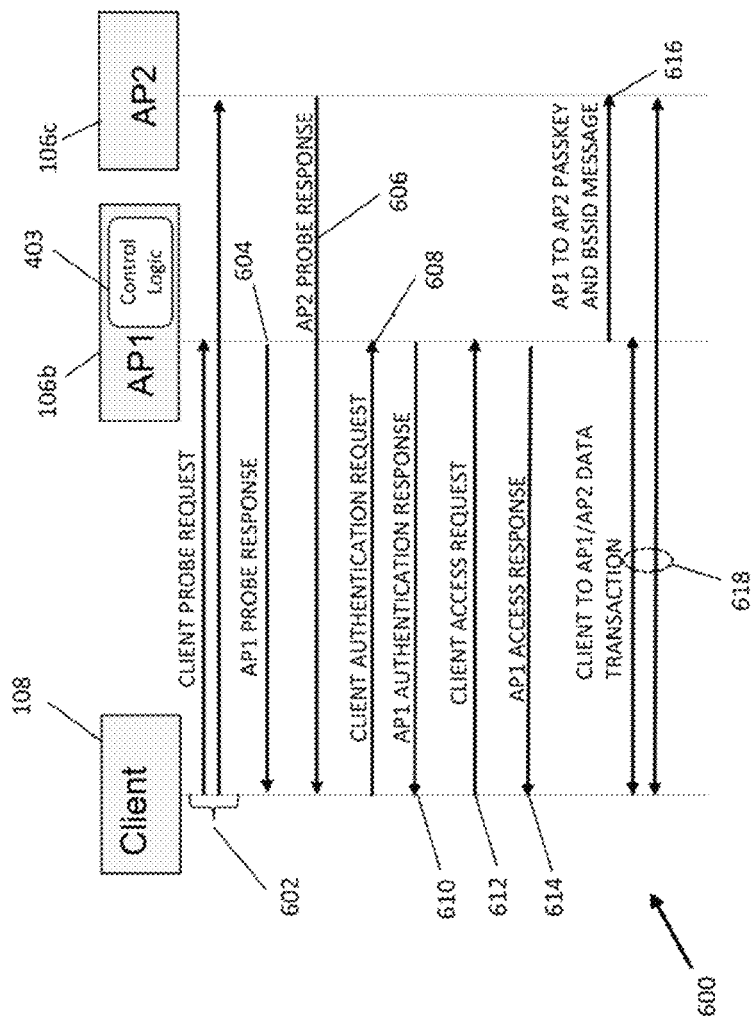
FIG. 6A is a ladder diagram showing exemplary message and data exchange between various entities within a WLAN a according to a first embodiment of the present disclosure.
Figure 6B:
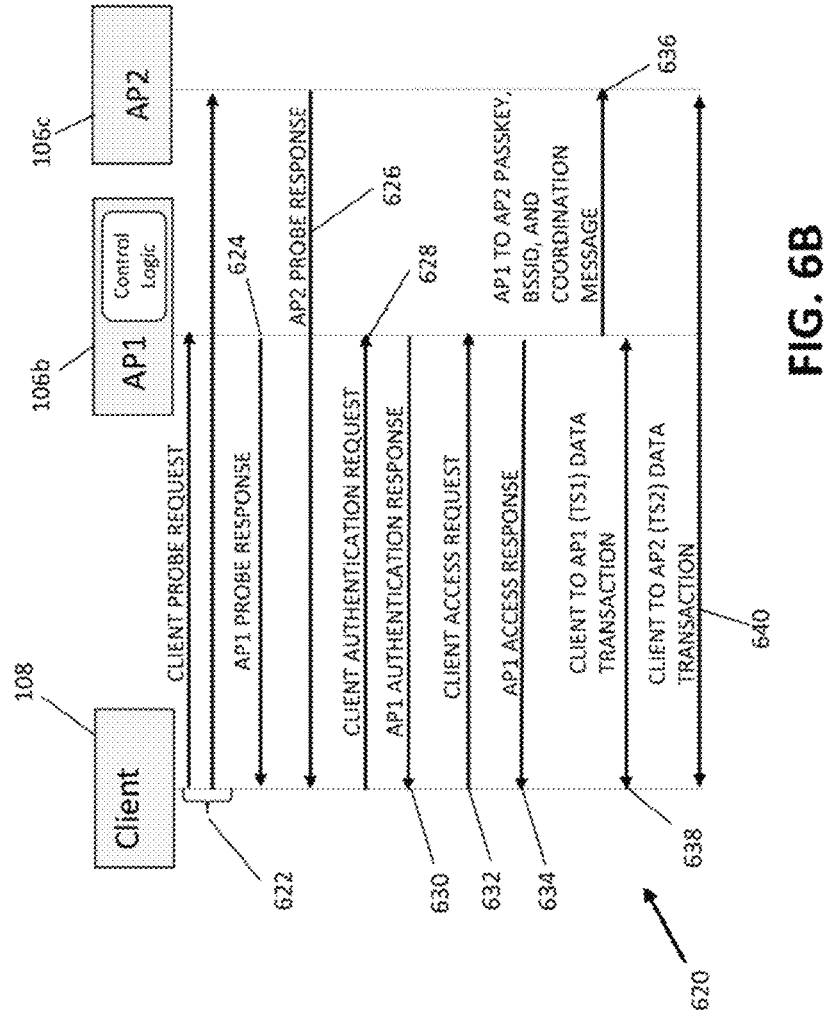
FIG. 6B is a ladder diagram showing exemplary message and data exchange between various entities within a WLAN a according to a second embodiment of the present disclosure.
Figure 6C:
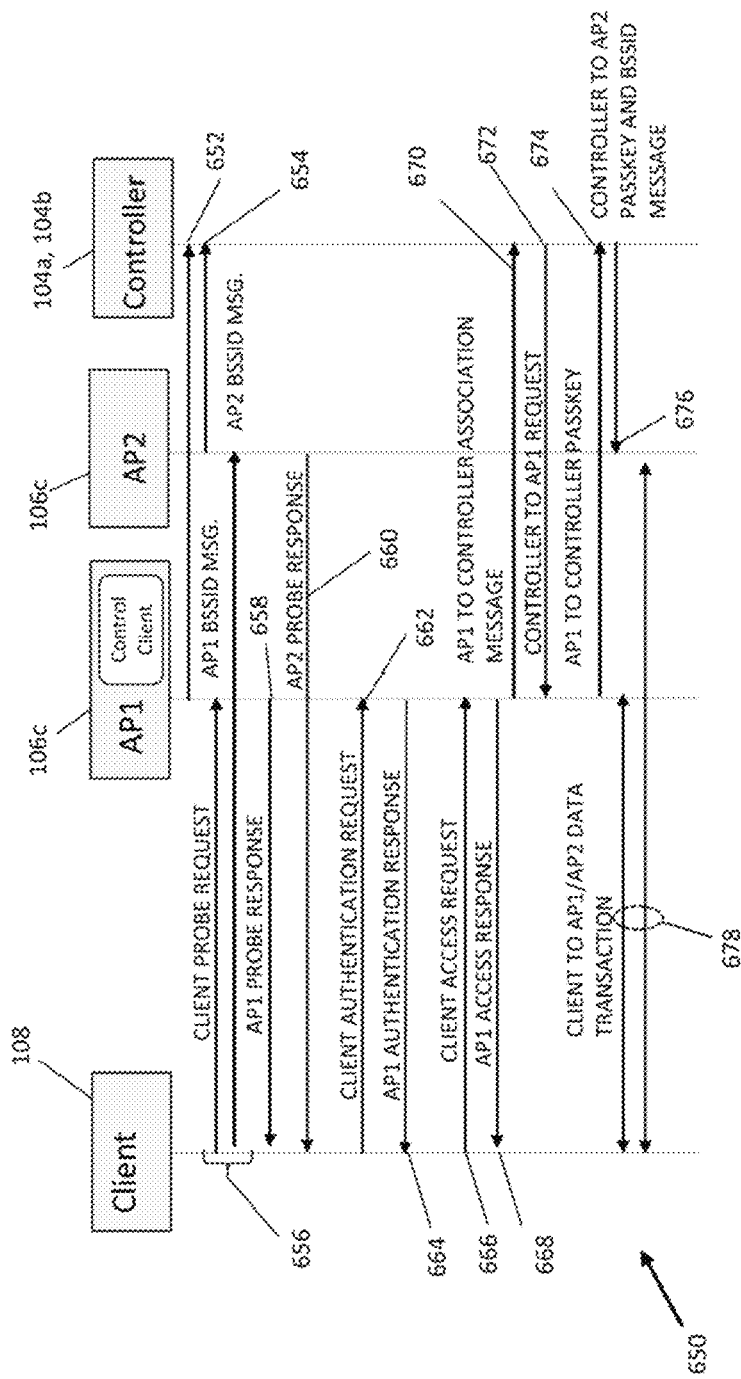
FIG. 6C is a ladder diagram showing exemplary message and data exchange between various entities within a WLAN a according to a third embodiment of the present disclosure.

FIGS. 6A-6C are ladder diagrams illustrating various exemplary communication flows between the entities of the various architectures of FIGS. 4A-4C.

In the approach 600 of FIG. 6A, AP-based controller logic 403 of AP1 106b first negotiates with the client via probe request 602 and response 604; AP2 in this scenario also receives the probe request and issues a response 606. The client then attempts to authenticate with AP1 via request 608 and response 610, and likewise subsequently requests access via request 612 and response 614. At this point, AP1 transmits a message 616 to AP2 to invoke the tandem or aggregated operation. In one variant, AP1 transmits the BSSID and passkey data to AP2 as shown. Once the client is associated with AP1 and AP2 has implemented AP1's BSSID and passkey data, data is transacted between the client 108 and both AP1 and AP2 on an opportunistic basis (i.e., using indigenous access/contention resolution mechanisms present within the underlying air interface standard (here, IEEE Std. 802.11). For instance, if AP1 and AP2 simultaneously attempt to transact data with the client using the same carrier at the same time, one of the two APs will detect that the medium is used, and back off or employ another approach to transact data with the client (e.g., via a different time slot).

In the approach 620 of FIG. 6B, similar probe/response actions 622, 624, 626 are taken, as are the authentication/response 628, 630 and access request/response 632, 634, yet in in this variant, time slot (TS) coordination data is also transmitted from the controller logic of AP1 via the message 636, and subsequently AP1 and AP2 utilize their designated time slots to respectively transact data 638, 640 with the client. It will be appreciated that while time slot or temporal offset is shown in this example, other mechanisms for contention resolution (i.e., differentiating one AP from the other) may be employed, such as e.g., use of different carriers.

In the approach 650 of FIG. 6C, similar probe/response actions 656, 658, 660 are taken, as are the authentication/response 662, 664 and access request/response 666, 668, yet in in this variant, AP2 is effectively a commodity device with no substantive controller logic, while AP1 includes client controller logic in logical communication with the network controller 104a, 104b. The APs are configured to: (i) report their BSSID values to the controller per respective messages 652, 654; (ii) report any associations formed per message 670; and (iii) receive/service requests 672 from the controller for e.g., AP1 passkey data generated from the reported association with the client 108 per response message 674. Per the instruction message 676 sent from the controller to AP2, AP2 assumes the BSSID and passkey of AP1, and the two APs operate in tandem/aggregation as previously described to transact data 678. It will be further appreciated that while extant contention resolution mechanisms such as those described above with respect to FIG. 6A may be used with the architecture of FIG. 6C, so may the time slot (TS) coordination or other mechanisms for contention resolution (i.e., differentiating one AP from the other, such as e.g., use of different carriers), as discussed with respect to FIG. 6B.

Exemplary Methods

Various methods and embodiments thereof for operating and controlling wireless networks according to the present disclosure are now described with respect to FIGS. 7A-7D and 8-8A. In the various embodiments of FIGS. 7A-7D, the AP controller logic (i) is integrated within AP1 as previously described herein (FIG. 7A), or (ii) the AP controller 104*a*, 104*b* may be a separate entity (such as an NC; see FIG. 3B), or is integrated within other APs in the network (as FIG. 7C). In another configuration, the AP controller already has AP1 identification data (e.g., by virtue of a prior communication between the AP and the controller).

Figure 7A:
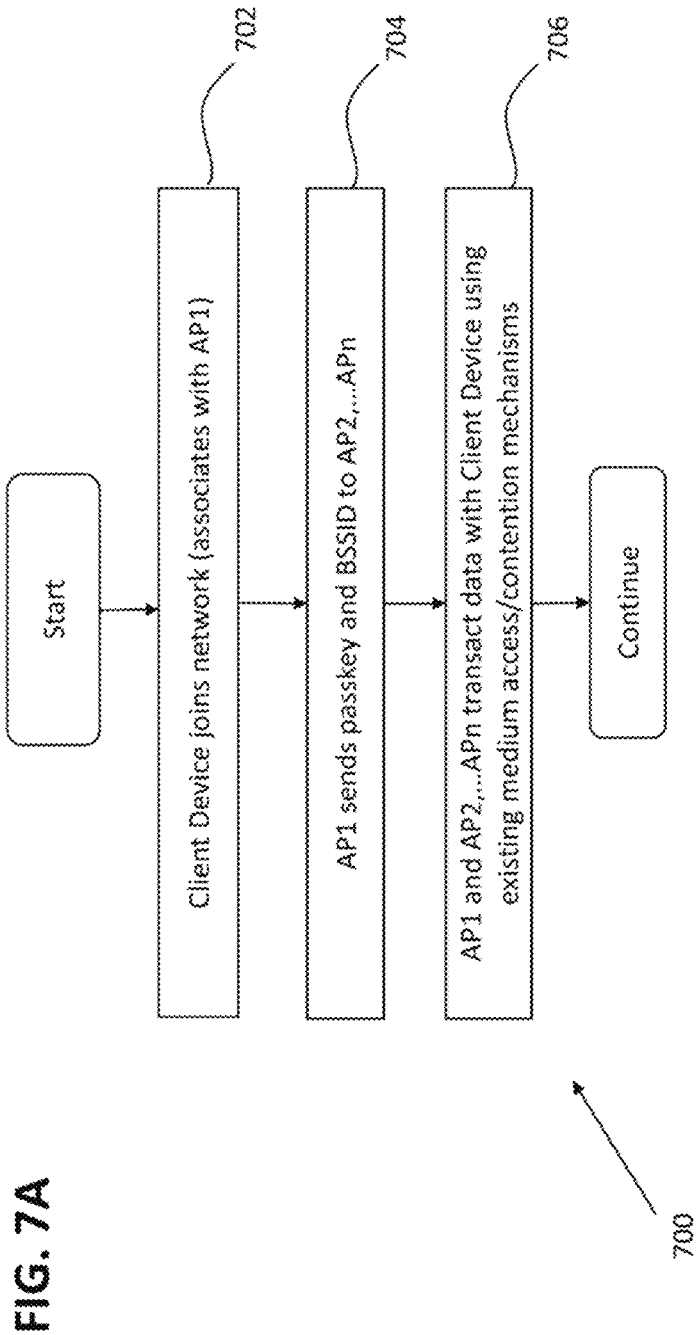
FIG. 7A is a logical flow diagram of an exemplary embodiment of a generalized method to service a client device using multiple APs of a WLAN according to the present disclosure.

FIG. 7A is a logical flow diagram of an exemplary embodiment of a generalized method 700 to service a client device using multiple directly communicative APs of a WLAN according to the present disclosure.

At step 702, a client device having wireless capabilities joins a WLAN by making an association with an access point (e.g., AP1) of the WLAN. In one embodiment, AP1 communicates with an authentication server (e.g., through a backhaul interface) to ascertain whether the client device has appropriate credentials to be connected to the WLAN. In one variant, the authentication server is integrated with AP1.

At step 704, AP1 sends client association information to AP2 and any other participative APs). The client association information may include for example AP1 address/identification, the client device address/identification, estimated signal strength between AP1 and the client device, and any other data related to the association between AP1 and the client device (e.g., BSSID and passkey data).

At step 706, the participating APs (AP1, AP2 . . . APn) all transact data with the client device 108 according to extant IEEE Std. 802.11 protocols (e.g., using existing contention resolution mechanisms).

Figure 7B:
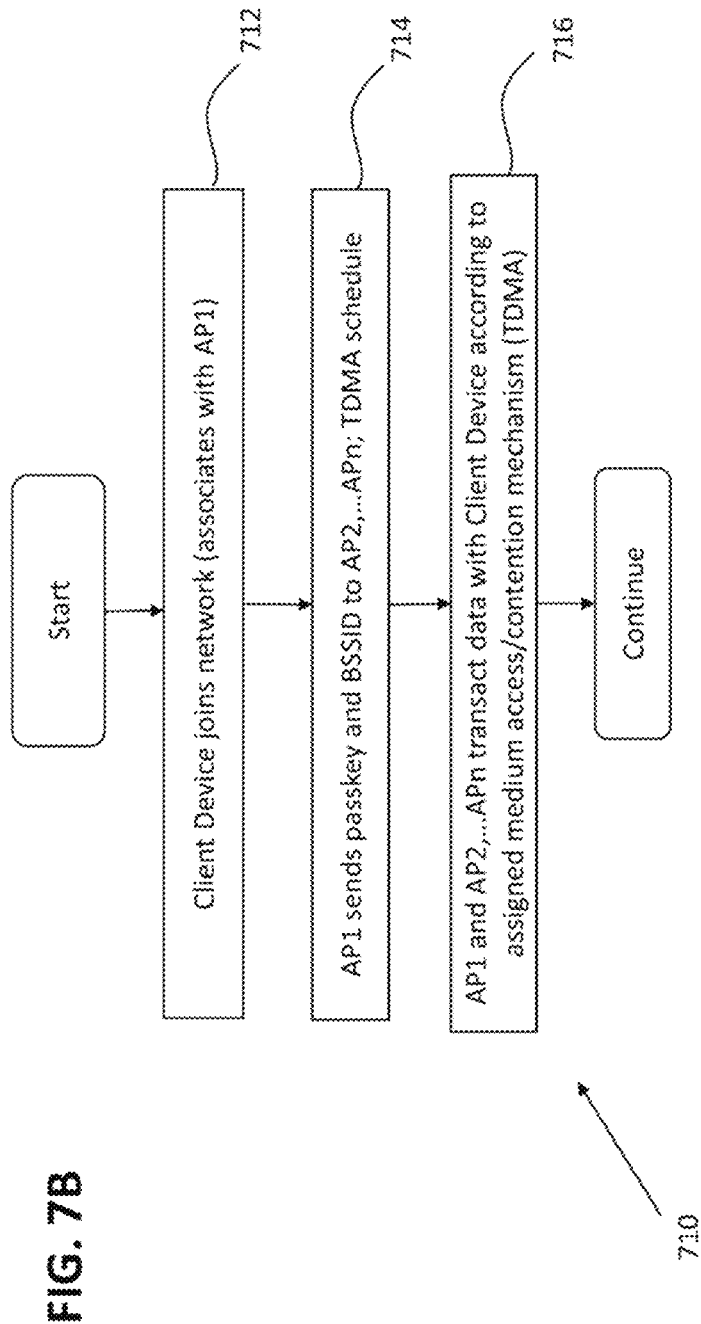
FIG. 7B is a logical flow diagram of another exemplary embodiment of a generalized method to service a client device using multiple APs of a WLAN according to the present disclosure.

FIG. 7B is a logical flow diagram of another exemplary embodiment of a generalized method 710 to service a client device using multiple APs of a WLAN according to the present disclosure. At step 712, the client device having wireless capabilities joins a WLAN by making an association with an access point (e.g., AP1) of the WLAN. In one embodiment, AP1 communicates with an authentication server (e.g., through a backhaul interface) to ascertain whether the client device has appropriate credentials to be connected to the WLAN. In one variant, the authentication server is integrated with AP1.

At step 714, AP1 sends client association information to a AP2 and any other participative APs). The client association information may include for example AP1 address/identification, the client device address/identification, estimated signal strength between AP1 and the client device, and any other data related to the association between AP1 and the client device (e.g., BSSID and passkey data). TDMA or other assigned contention resolution mechanism data (e.g., slot assignments or other such data) is also sent to the participating AP(s) so that it/they can utilize proper coordination with AP1.

At step 716, the participating APs (AP1, AP2 . . . APn) all transact data with the client device 108 according to extant IEEE Std. 802.11 protocols, yet using a specified (e.g., predetermined) contention avoidance or medium access protocol, such as a slotted TDMA or similar, as described in greater detail below with respect to FIGS. 9A-10D.

Figure 7C:
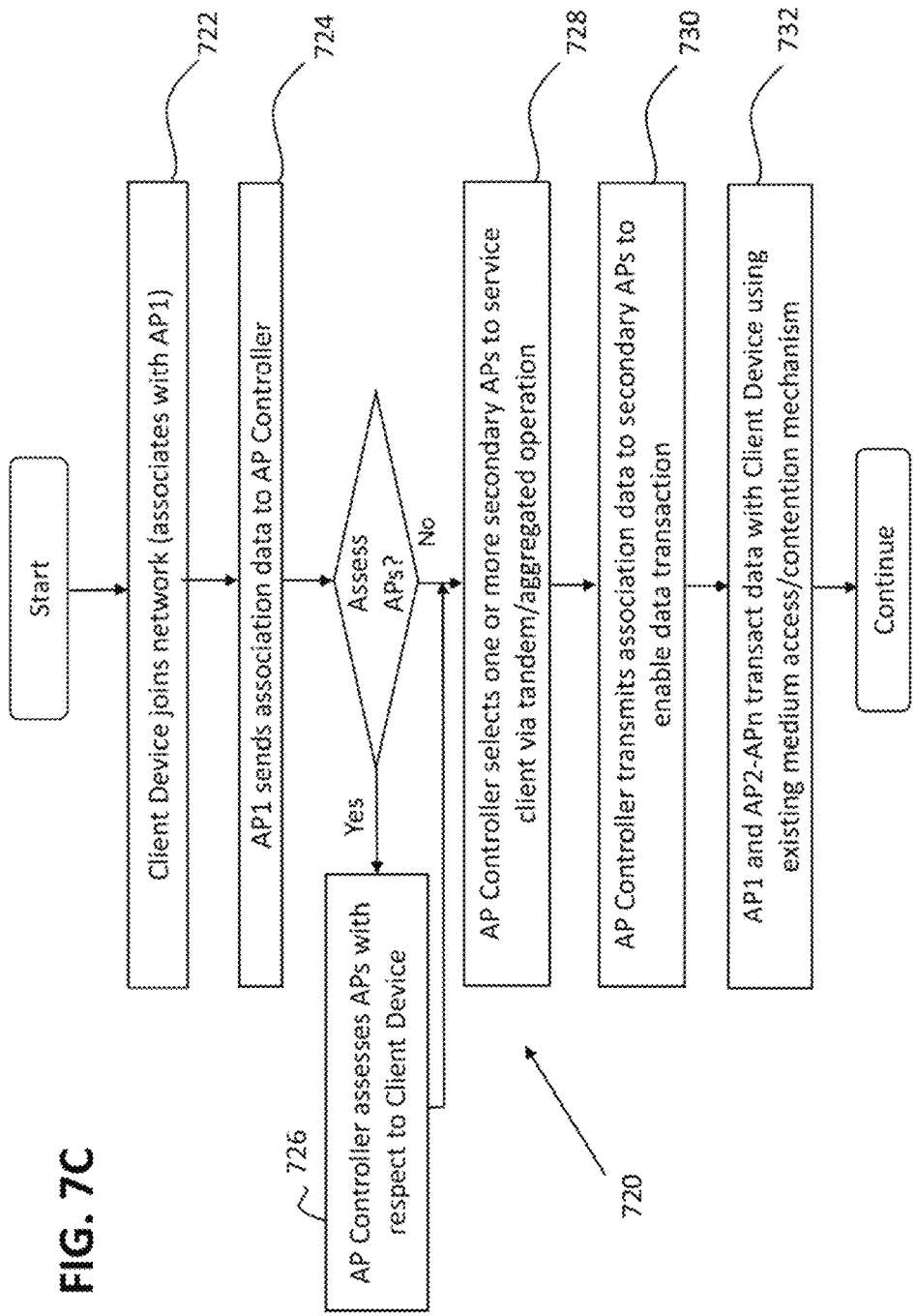
FIG. 7C is a logical flow diagram of a further exemplary embodiment of a generalized method to service a client device using multiple APs of a WLAN according to the present disclosure.

FIG. 7C is a logical flow diagram of a further exemplary embodiment of a generalized method 720 to service a client device using multiple APs of a WLAN and a controller, according to the present disclosure.

At step 722, the client device having wireless capabilities joins a WLAN by making an association with an access point (e.g., AP1) of the WLAN. In one embodiment, AP1 communicates with an authentication server (e.g., through a backhaul interface) to ascertain whether the client device has appropriate credentials to be connected to the WLAN. In one variant, the authentication server is integrated with the controller 104*a*, 104*b*.

At step 724, AP1 sends client association information to a designated AP Controller. As in prior embodiments, the client association information may include for example AP1 address/identification, the client device address/identification, estimated signal strength between AP1 and the client device, and any other data related to the association between AP1 and the client device (e.g., BSSID and passkey data).

At step 726, the AP Controller assesses all or a prescribed subset of network APs with respect to the newly added client device. This (optional) assessment may be active in nature; e.g., it may involve a query to each AP being assessed to return data such as measured RSSI, active associations, powered on/off status, etc., or may be passive in nature; e.g., via data measured or obtained relative to the target AP such as bandwidth it is currently utilizing on its backhaul, error reports or logs previously lodged with a controller or other MSO entity, data regarding its geographic location. In one embodiment, the AP Controller instructs each AP within the network to gauge its signal strength and communication capability with the client device. The AP Controller may create a directory or listing of active network APs that may viably communicate with the client device. The directory of usable APs may be ranked by, e.g., signal strength to the client device, by some other parameter, or by a combination of parameters including signal strength. Alternately, the directory of usable APs may be unranked. The assessment step may be repeated periodically by the AP Controller in order to keep the directory or listing current. Alternately, the assessment step may be performed at certain prompts—such as when the AP Controller receives a request from the client device or an AP with which the client has formed an association.

At step 728, the AP Controller selects one or more secondary APs to service client via tandem/aggregated operation, such as based on the assessment of step 726 (if performed). Otherwise, the Controller may utilize a pre-existing listing or order of priority for AP usage, or determine a listing dynamically based on which APs are determined to be online/powered up or communicative with the client (e.g., within ranges), such as via probe responses.

At step 730, the AP Controller transmits association data to secondary APs to enable data transaction.

At step 732, AP1 and AP2-APn transact data with Client Device using existing medium access/contention mechanisms.

Figure 7D:
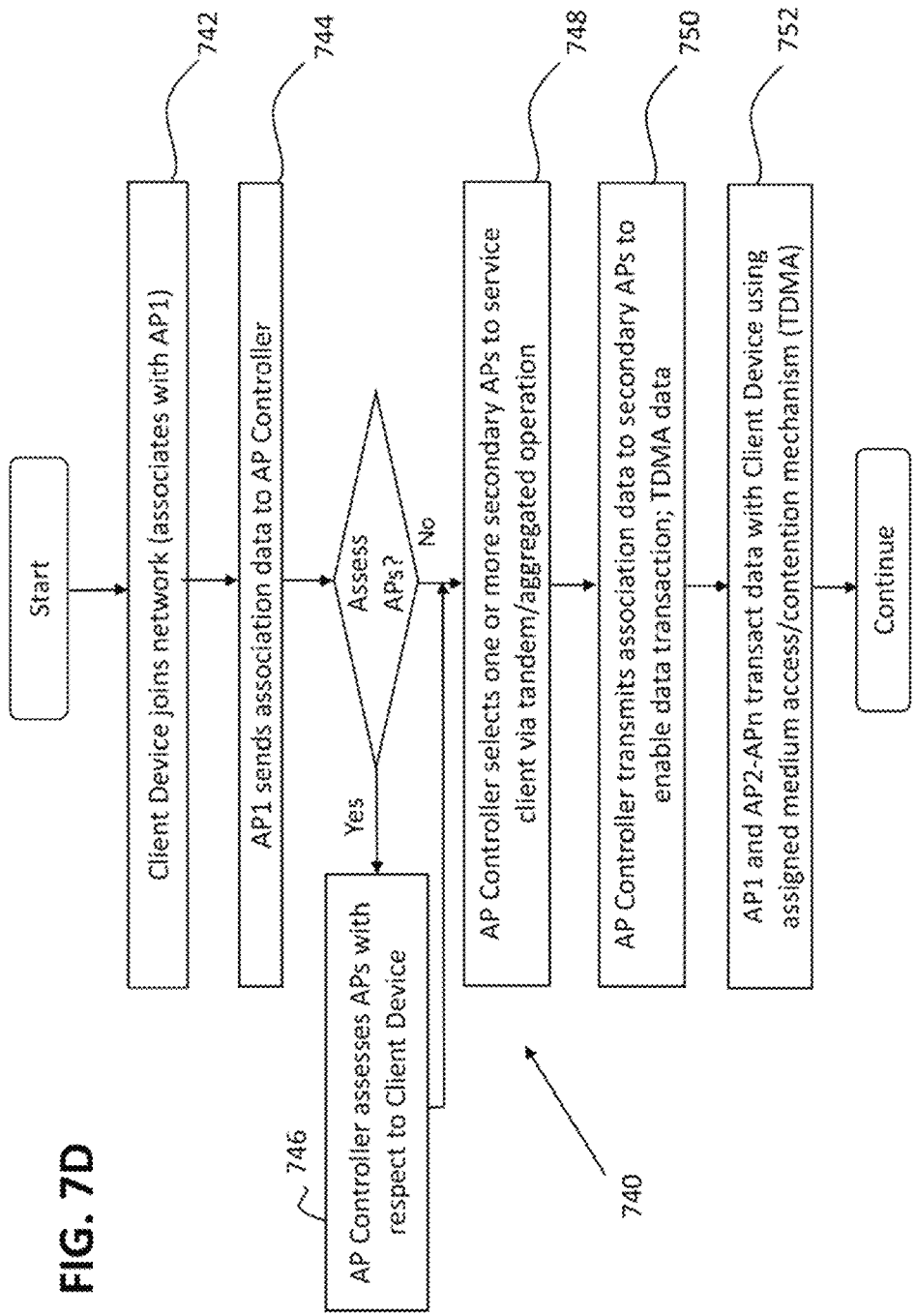
FIG. 7D is a logical flow diagram of yet another exemplary embodiment of a generalized method to service a client device using multiple APs of a WLAN according to the present disclosure.

FIG. 7D is a logical flow diagram of yet another exemplary embodiment of a generalized method to service a client device using multiple APs of a WLAN according to the present disclosure.

At step 742, the client device having wireless capabilities joins a WLAN by making an association with an access point (e.g., AP1) of the WLAN. In one embodiment, AP1 communicates with an authentication server (e.g., through a backhaul interface) to ascertain whether the client device has appropriate credentials to be connected to the WLAN. In one variant, the authentication server is integrated with the controller 104a, 104b.

At step 744, AP1 sends client association information to a designated AP Controller. As in prior embodiments, the client association information may include for example AP1 address/identification, the client device address/identification, estimated signal strength between AP1 and the client device, and any other data related to the association between AP1 and the client device (e.g., BSSID and passkey data).

At step 746, the AP Controller assesses all or a prescribed subset of network APs with respect to the newly added client device. This (optional) assessment may be active in nature; e.g., it may involve a query to each AP being assessed to return data such as measured RSSI, active associations, powered on/off status, etc., or may be passive in nature; e.g., via data measured or obtained relative to the target AP such as bandwidth it is currently utilizing on its backhaul, error reports or logs previously lodged with a controller or other MSO entity, data regarding its geographic location. As in prior embodiments, the AP Controller may instruct each AP within the network to gauge its signal strength and communication capability with the client device. The AP Controller may create a directory or listing of active network APs that may viably communicate with the client device. The directory of usable APs may be ranked by, e.g., signal strength to the client device, by some other parameter, or by a combination of parameters including signal strength. Alternately, the directory or listing of usable APs may be unranked. The assessment step may be repeated periodically by the AP Controller in order to keep the directory or listing current. Alternately, the assessment step may be performed at certain prompts—such as when the AP Controller receives a request from the client device or an AP with which the client has formed an association.

At step 748, the AP Controller selects one or more secondary APs to service client via tandem/aggregated operation, such as based on the assessment of step 746 (if performed). Otherwise, the Controller may utilize a pre-existing listing or order of priority for AP usage, or determine a listing dynamically based on which APs are determined to be online/powered up or communicative with the client (e.g., within ranges), such as via probe responses.

At step 750, the AP Controller transmits association data to secondary APs to enable data transaction.

At step 752, AP1 and AP2-APn transact data with Client Device using an assigned medium access/contention mechanism such as TDMA.

Figure 8:
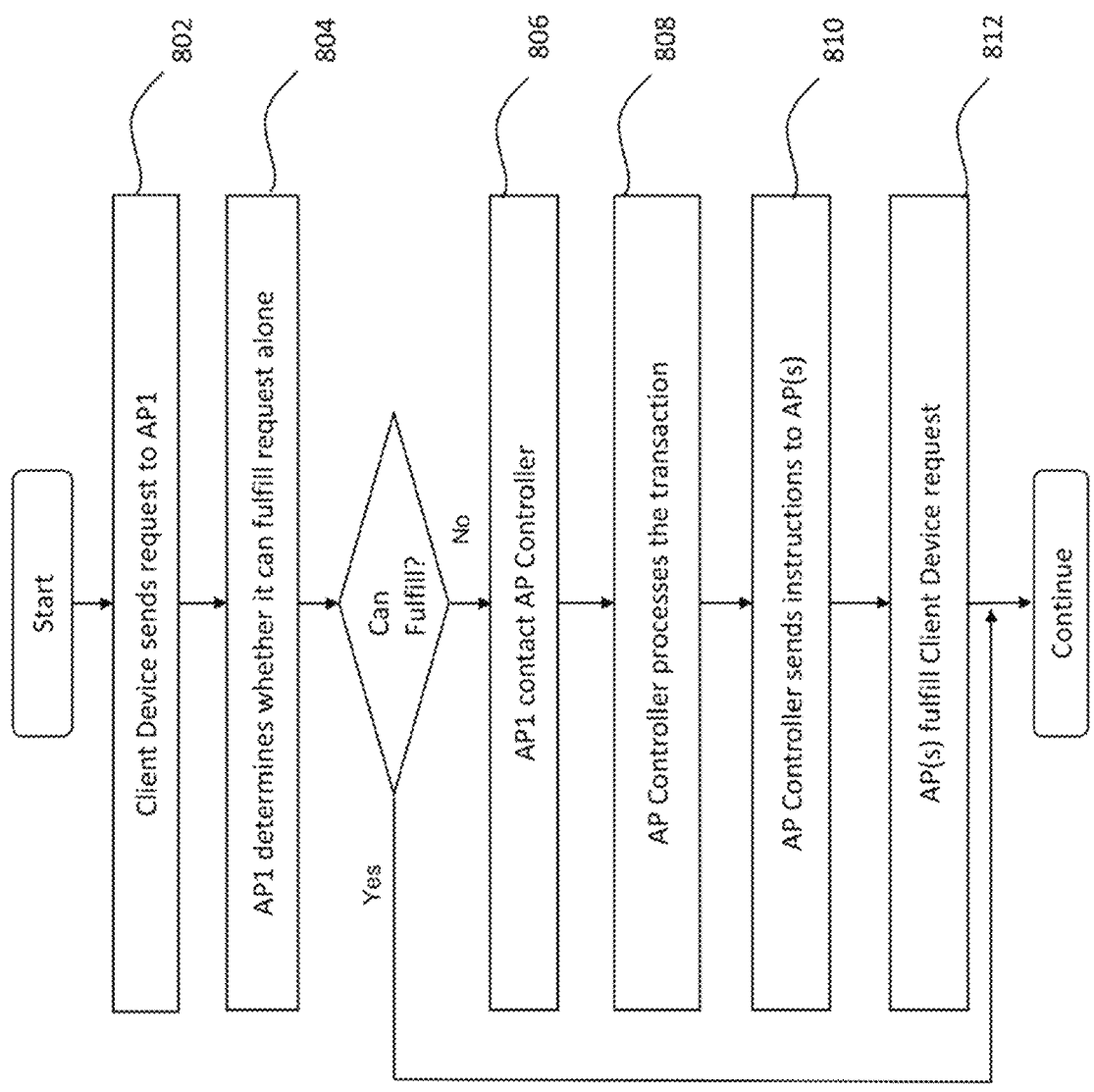
FIG. 8 is a logical flow diagram of an exemplary embodiment of a method for servicing a client device transaction by multiple APs of a WLAN of the present disclosure.

FIG. 8 illustrates an exemplary methodology 800 of fulfilling a client device request within a WLAN. This methodology utilizes logic within the contacted AP to determine that additional APs are necessary to service a client data transaction. At step 802, a client device associated with an access point (e.g., AP1) of a WLAN sends a network request to the access point. The request may be a download request or an upload request (e.g., an RTS frame specifying the estimated time duration for the upload). The request may be part of a video call, a voice call, a video/game stream, a file transfer, etc. At step 804, the peer or controller logic in AP1 evaluates the request to determine if it can fulfill the request in accordance with one or more parameters. The parameters may include for instance a threshold time $t_{th}$ for finishing the request, current state of AP1, current pending requests for other clients at AP1, the size of the data to be transacted, or any number of other factors. The parameters may also include Quality of Service parameters or requirements associated with the request, including throughput, transit delay, priority and protection. For example, AP1 may determine that the request should be completed within time $t_{th}$ of receipt of the request and that AP1 does not have enough available bandwidth or other resources within $t_{th}$ to fulfill the entire request (e.g., available TDMA time slots in variants where a TDMA access scheme is assigned; see e.g., FIGS. 7B and 7D). In another variant, AP1 may determine that the client request demands a starting time that AP1 cannot fulfill.

In the event that AP1 determines that it can fulfill the client device request according to specified parameters, AP1 may fulfill the client request (and steps 806-812 of the method 800 may be skipped). Note that in one alternate configuration, step 804 may be skipped such that, upon receipt of a client device request, AP1 immediately passes on the client request information to the AP Controller per step 806 without performing its own evaluation/determination process.

At step 806, AP1 sends client request information to an AP Controller process. Note that this controller process may be co-located within the AP (see FIG. 2A), or alternatively may be a network based controller (NC) 104b. The client request information may include for example the request itself, client device identification (e.g., MAC, assigned device name, network address), AP1 identification, AP1 schedule, any necessary security information, and/or the parameters for the request. The AP1 schedule if used may include time slot data (e.g., if a TDMA access scheme is applied), idle/occupied time period information of AP1 through a predetermined time (e.g., N ms); e.g., corresponding to CTS or other "free periods" presently identified.

At step 808, the AP controller processes the client request information and, based on the client request information, and develops a response. This response may include for example assignment of one or more other APs within the aforementioned directory or listing maintained by the controller (or transmitted to the controller from AP1, such as other APs within the target WLAN), and optionally assignment of a media access schedule or scheme (e.g., TDMA slots). For instance, in one variant, the controller creates an optimized transmission schedule for the request. In one embodiment, the transmission schedule includes scheduled download and/or upload time slots assigned for one or more network APs (note that all APs need not necessarily use the assigned schedule, but this is typically most efficient as compared to contention-based management). Similarly, the one or more APs assigned may or may not include AP1. One exemplary implementation of this process is described in more detail with respect to FIG. 8B.

At step 810 of FIG. 8A, the AP Controller sends instructions to the one or more network APs, based on the generated response (e.g., BSSID/passkey data, optimized transmission schedule if used, etc.). For example, an assigned or aggregated AP may receive instructions to transmit part of a download to the client device during time slots 1-3, another AP may receive instructions to transmit another part of a download to the client device during time slots 4-5, and a third AP may receive instructions to leave time slots 6-8 open in anticipation of a transmission from the client device.

At step 812, the APs fulfill the client device request according to the received instructions—under the identity of AP1, and using the provided transmission schedule if utilized.

FIG. 8B illustrates an exemplary implementation of the methodology of step 808 (in FIG. 8A) of processing a client device request. At step 808-1 of the method, the AP Controller obtains or creates a directory or listing of usable APs that may viably communicate with the client device (as previously described); e.g., those within the target WLAN and powered on or otherwise accessible by the client. As such, the controller may also "ping" each listed AP using inter-device protocols, or access/call an API resident on the AP(s), to verify its status/connectivity. For instance, such API may return power on/off state, recent probe requests/responses, recent association data, RSSI or other signal strength data, etc.

At step 808-2, the AP Controller obtains data, which may optionally include schedules (i.e., idle/occupied time slot data) for every AP in the directory or listing. See, for example, FIG. 9A or 10A below. This obtained data, as noted above, may also include data enabling the controller to make an "intelligent" selection (e.g., select only APs that are (i) within the same SSID/WLAN; (ii) are currently powered on; (iii) are currently communicative with the target client (e.g., via probe/response transactions); (iv) have previously successfully associated with the client (e.g., credentials are operative and not out of date), and/or (v) are configured to "auto-associate" with the client without client or network manager assent (thereby providing a more seamless user experience for the client).

At step 808-3, the AP Controller distributes the necessary data to service client request among the selected APs, which may optionally include an optimized transmission schedule for the client request. The optimized transmission schedule can include all or some of the APs from the directory of usable APs. In one implementation, the optimized transmission schedule may have AP1 and no other APs. In another implementation, the optimized transmission schedule may include AP1 and one or more other APs from the directory. In a third implementation, the optimized transmission schedule may have one or more APs from the directory, excluding AP1.

Various machine learning (ML) or artificial intelligence (AI) or other algorithms can be applied to the analysis, selection and "distribution" of the client request. For example, the AP Controller (or a designated analysis proxy process such as a headend analytics server) can prioritize (in addition to the "intelligent" selection criteria above): (i) using fewer APs, (ii) using APs only within a threshold signal strength of the client device, (iii) fulfilling the request in as shorter time, (iv) using some APs only for download or only for upload requests, or (v) some combination of any of the above parameters. See, for example, FIGS. 9B and 10B-10D below.

FIGS. 9A-9B illustrate some example time schedules, according to features of the present disclosure. FIG. 9A shows example time slot schedules of three network APs (AP1, AP2, AP3). In this example, the three APs have been identified as APs that may viably communicate with the client device. The AP Controller obtains time schedules for time $t_{th}$ from the three APs. This process is described above with respect to step 808-2 (FIG. 8B). The "busy" time slots may include time slots that have already been assigned to other transmissions (for sending or receiving data on the channel) or reserved for non-transmission of data.

FIG. 9B shows one possible optimized transmission schedule for a client device request. The AP Controller creates the transmission schedule with ordered priorities of, for example: (i) finishing the transmission request within a threshold time $t_{th}$ and (ii) placing a maximum portion of the request on AP1 first, AP2 second, and AP3 third. Note that the transmission schedule is only illustrative, and other transmission schedules using different priorities may be created consistent with the present disclosure.

Figure 10D:
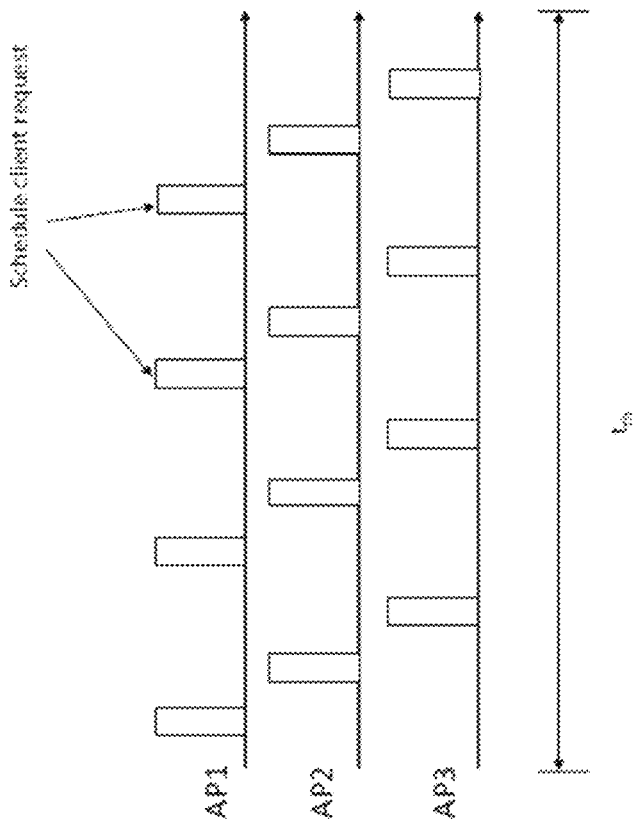
Figure 10C:
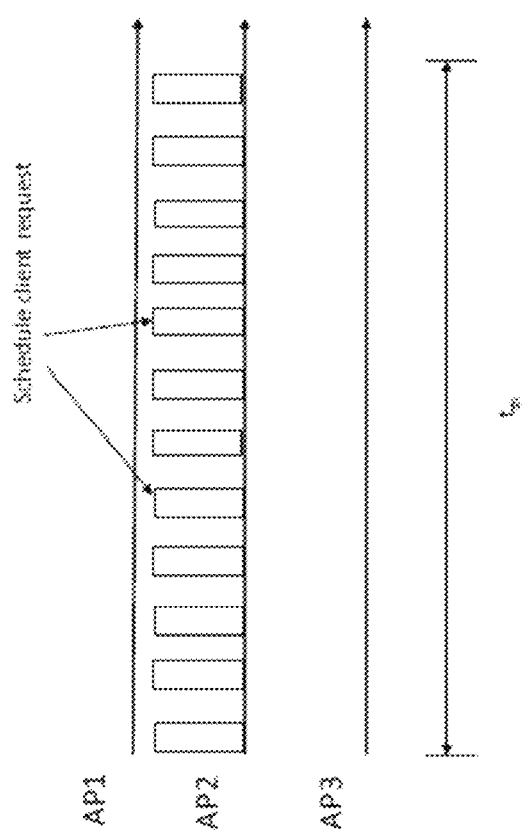

In another illustrative example, FIGS. 10A-10B show different transmission schedules of three network APs. FIG. 10A shows initial AP1/AP2/AP3 schedules where the three network APs are completely free within a threshold time $t_{th}$. Depending on the distribution algorithm, the AP Controller may schedule the entirety of a client request to AP1 (FIG. 10B), schedule the client request to AP2 (FIG. 10C), or it may choose to distribute the client request among AP1, AP2, and AP3 (FIG. 10D). Any number of other distributions are possible depending on the parameters and algorithm used by the AP Controller.

It will be appreciated that while the exemplary embodiments of the methods and apparatus of the present disclosure are cast primarily in terms of "commodity" clients (e.g., STAs) which have no dedicated logic or applications for implementing the various aspects of the disclosure (i.e., they are effectively "off the shelf" Wi-Fi compliant devices) for purposes of ubiquity and ease of adoption, such clients/STAs may also be modified to varying degrees (e.g., via firmware, and/or application software operative to run on the client) in order to implement the various functions described herein. For example, the present disclosure contemplates that the MSO might provide the user with the ability to download an app or install a firmware upgrade to their smartphone or mobile device or PC which would enable or further enhance the ability of the client/STA to associate with multiple APs "simultaneously" (e.g., using extant medium access mechanisms specified in the Wi-Fi standards, or according to a prescribed medium access schedule, or other).

Additional Considerations

Where certain elements of these implementations can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not be considered limiting; rather, the disclosure is intended to encompass other implementations including a plurality of the same component, and vice versa, unless explicitly stated otherwise herein. Further, the present disclosure encompasses present and future known equivalents to the components referred to herein by way of illustration.

It will also be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of managing a wireless local area network having a plurality of wireless-enabled access points (APs), the computerized method comprising:
    establishing an association between a computerized client device and a first AP of the plurality of wireless-enabled APs;
    accepting data indicative of a request to transact data from the computerized client device through the first AP;
    evaluating at least a portion of the data indicative of the request to determine at least a sufficiency of the first AP to service the request within a prescribed time period commenced with receipt of the data indicative of the request, the prescribed time period based on one or more quality of service (QoS) requirements;
    based on the evaluating, causing selection of two or more of the plurality of wireless enabled APs to fulfill the request; and
    fulfilling the request using the two or more of the plurality of wireless enabled APs.

2. The computerized method of claim 1, wherein the fulfilling of the request using the two or more of the plurality of wireless enabled APs comprises utilizing a common BSSID (Basic Service Set Identifier) and passkey data for each of the two or more APs.

3. The computerized method of claim 2, wherein the utilizing of the common BSSID and the passkey data for the each of the two or more APs comprises using the BSSID and the passkey data associated with the established association between the computerized client device and the first AP.

4. The computerized method of claim 1, wherein the fulfilling the request using the two or more of the plurality of APs comprises sending instructions to the two or more of the plurality of wireless enabled APs comprising: (i) an optimized transmission schedule for the request and (ii) identification data associated with the first AP.

5. The computerized method of claim 1, wherein the data representative of the request comprises data indicative of a required time for transacting the data associated with the request.

6. The computerized method of claim 1, wherein the two or more of the plurality of wireless enabled APs do not include the first AP.

7. The computerized method of claim 1, wherein the fulfilling the request comprises:
    creating a directory of wireless enabled APs;
    obtaining schedule data from the directory of wireless enabled APs; and
    creating a transmission schedule for the request, based on the schedule data from the directory of wireless enabled APs.

8. The computerized method of claim 7, wherein the creating of the directory of APs comprises at least assessing the plurality of wireless enabled APs to determine a signal strength associated with each of the plurality of wireless enabled APs for the computerized client device.

9. The computerized method of claim 8, wherein the creating of the directory of APs further comprises ranking the plurality of wireless enabled APs according to the signal strength, and excluding from the directory of wireless enabled APs individual ones of the plurality of wireless enabled APs whose signal strength falls below a threshold signal strength.

10. Computerized access point (AP) apparatus configured for use within at least one local area network, the computerized AP apparatus comprising:
    a wireless transceiver configured to utilize a wireless local area network (W LAN) air interface protocol;
    processor apparatus in data communication with the wireless transceiver; and
    storage apparatus in data communication with the processor apparatus and having a non-transitory computer-readable storage medium, the non-transitory computer-readable storage medium comprising at least one computer program having a plurality of instructions configured to, when executed by the processor apparatus, cause the computerized AP apparatus to:
        receive data representative of a request issued from a wireless-enabled client device, the request relating to a transaction of user data between the computerized AP apparatus and the wireless-enabled client device;
        perform an evaluation of at least a portion of the received data representative of the request to determine at least a sufficiency of the computerized AP apparatus to service the request, wherein the evaluation comprises evaluation of at least whether the computerized AP apparatus can service the request within a prescribed time period; and
        based at least on the evaluation, service the request, the service of the request comprising the transaction of the user data: (i) between the computerized AP apparatus and the wireless-enabled client device, and (ii) between a wireless apparatus associated with the at least one local area network and the wireless-enabled client device;
    wherein:
        the prescribed time period commences with the receipt of the data representative of the request; and
        the servicing of the request in the prescribed time period is in accordance with one or more quality of service (QoS) requirements.

11. The computerized AP apparatus of claim 10, wherein the plurality of instructions are further configured to, when executed by the processor apparatus, cause the computerized AP apparatus to:
    based at least in part on the evaluation, cause:
        generation of at least one message for transmission to the wireless apparatus, the at least one message (i) comprising data relating to an association between the computerized AP apparatus and the wireless-enabled client device, and (ii) configured to cause the wireless apparatus to utilize the data relating to the association to enable the transaction of the user data between the wireless apparatus and the wireless-enabled client device substantially in parallel with the transaction of the user data between the computerized AP apparatus and the wireless-enabled client device; and
        transmission of the at least one message to the wireless apparatus.

12. The computerized AP apparatus of claim 11, wherein the transmission of the at least one message to the wireless apparatus comprises transmission via at least a wireline data network interface between the AP apparatus and the wireless apparatus.

13. The computerized AP apparatus of claim 12, wherein the wireline data network interface comprises a protocol specifying network addresses for each of the AP apparatus and the wireless apparatus within the at least one local area network, and the transmission comprises transmission to a network address of the wireless apparatus.

14. The computerized AP apparatus of claim 11, wherein the data relating to the association between the computerized AP apparatus and the wireless-enabled client device comprises at least a BSSID (Basic Service Set Identifier) and passkey data.

15. The computerized AP apparatus of claim 10, wherein the plurality of instructions are further configured to, when executed by the processor apparatus, cause the computerized AP apparatus to:
maintain a registry or listing of at least a portion of computerized AP apparatus within the at least one local area network; and
select the wireless apparatus from the registry or listing.

16. The computerized AP apparatus of claim 15, wherein the plurality of instructions are further configured to, when executed by the processor apparatus, cause the computerized AP apparatus to:
perform the selection of the wireless apparatus from the registry or listing based at least on algorithmic evaluation of one or more parameters associated with each of the at least portion of computerized AP apparatus within the registry or listing, the one or more parameters selected from the group consisting of: (i) historical data relating to association with the wireless-enabled client device; and (ii) current availability status.

17. The computerized AP apparatus of claim 10, wherein the wireless apparatus comprises a commodity WLAN AP apparatus, and the at least one computer program of the computerized AP apparatus comprises firmware disposed onto the computerized AP apparatus after manufacture of the computerized AP apparatus.

18. The computerized method of claim 1, wherein the selection is based at least one of the two or more of the plurality of wireless enabled APs being configured to automatically associate with the computerized client device without assent from at least one of the computerized client device or an entity of the wireless local area network.

19. Computer readable apparatus comprising a non-transitory storage medium, the non-transitory storage medium comprising at least one computer program having a plurality of instructions, the plurality of instructions configured to, when executed on a processing apparatus, cause a computerized apparatus to:
receive data representative of a request from a wireless-enabled client device, the request relating to a transaction of user data between at least a computerized AP apparatus and the wireless-enabled client device;
cause evaluation of at least a portion of the data representative of the request to determine at least a sufficiency of the computerized AP apparatus to service the request within a prescribed time period, wherein the prescribed time period (i) commences with the receipt of the data representative of the request, and (ii) is in accordance with one or more quality of service (QoS) requirements; and
based at least on the evaluation, cause service of the request, the service of the request comprising the transaction of the user data: (i) between the computerized AP apparatus and the wireless-enabled client device, and (ii) between a wireless apparatus associated with at least one local area network and the wireless-enabled client device.

20. The computer readable apparatus of claim 19, wherein the plurality of instructions are further configured to, when executed by the processor apparatus, cause the computerized apparatus to:
cause use of the computerized AP apparatus for only servicing download requests or only servicing upload requests.

21. The computer readable apparatus of claim 19, wherein the transaction of the user data comprises instructions for the wireless apparatus to transact data under an identification of the computerized AP apparatus.

* * * * *